United States Patent [19]
Qi

[11] Patent Number: 6,012,813
[45] Date of Patent: Jan. 11, 2000

[54] ASPHERICAL SPECTACLE LENS

[75] Inventor: Hua Qi, Tokyo, Japan

[73] Assignee: Hoya Corporation, Tokyo, Japan

[21] Appl. No.: 09/094,638

[22] Filed: Jun. 15, 1998

[30] Foreign Application Priority Data

Jun. 19, 1997 [JP] Japan ................................ 9-162941

[51] Int. Cl.$^7$ ................................................. G02C 7/02
[52] U.S. Cl. ......................................... 351/176; 351/177
[58] Field of Search ............................. 351/159, 169, 351/176, 177

[56] References Cited

U.S. PATENT DOCUMENTS

| | | | |
|---|---|---|---|
| 5,270,746 | 12/1993 | Kato et al. | 351/176 |
| 5,479,220 | 12/1995 | Komatsu et al. | 351/176 |
| 5,610,670 | 3/1997 | Ueno | 351/176 |
| 5,767,939 | 6/1998 | Komatsu et al. | 351/176 |

FOREIGN PATENT DOCUMENTS

| | | |
|---|---|---|
| 54-131950 | 10/1979 | Japan . |
| 57-10112 | 1/1982 | Japan . |
| 64-40926 | 2/1989 | Japan . |
| WO 93/07525 | 4/1993 | WIPO . |

*Primary Examiner*—Scott J. Sugarman
*Attorney, Agent, or Firm*—Oliff & Berridge, PLC

[57] ABSTRACT

An aspherical lens by which residual aberration in all of third eye-positions is corrected and which the center or edge thickness can be reduced. Thus, this aspherical lens employs a first or second curved surface represented by the following equation:

$$x(y, z) = \sum_{i=0}^{n_y+m_y-1} \sum_{j=0}^{n_z+m_z-1} c_{i,j} N_{m_y,i}(y) N_{m_z,j}(z)$$

where (x, y, z) represents the coordinates of a point on an aspherical surface and satisfies (y∈[a, b])∩(z∈[c. d]); $m_y$ is an order of a spline function in the direction of the y-axis (in this case, an integer which is not less than 4); $m_z$ is an order of the spline function in the direction of the z-axis (in this case, an integer which is not less than 4); $n_y$ is the number of inner knots in [a, b] in the direction of the y-axis (in this case, an integer which is not less than 4); $n_z$ is the number of inner knots in [c, d] in the direction of the z-axis (in this case, an integer which is not less than 4); $N_{m_y,i}(y)$ represents an ith $m_y$-th-order normalized B-spline function in the case that knots in the direction of the y-axis are $\xi_0, \xi_1, \xi_2, \ldots, \xi_{ny+2my-1}$ (incidentally, "i" is an integer within $[o, n_m+m_y-1]$ and the position of each knot meets the following condition: $\xi_0 \leq \xi_1 \leq \ldots \leq \xi_{m_y-1} \leq a < \xi_{m_y} \leq \ldots \leq \xi_{ny+my-1} < b \leq \xi_{ny+my} \leq \ldots \leq \xi_{ny+my+1}$; $N_{m_z,i}(z)$ represents an jth $m_z$-th-order normalized B-spline function in the case that knots in the direction of the z-axis are $\xi_0, \xi_1, \xi_2, \ldots, \xi_{nz+2mz-1}$ (incidentally, "j" is an integer within $[0, n_z+m_z-1]$ and the position of each knot meets the following condition: $\xi_0 \leq \xi_1 \leq \ldots \leq \xi_{m_z-1} \leq c < \xi_{m_z} \leq \ldots \leq \xi_{nz+mz-1} < d \leq \xi_{nz+mz} \leq \ldots \leq \xi_{nz+2mx-1}$; and $c_{i,j}$ is a coefficient.

15 Claims, 21 Drawing Sheets

COMPARATIVE EXAMPLE 1-1(PE)
○:0.1Diopter

EXAMPLE 1-1 (AS)
1:0.1Diopter

EXAMPLE 1-1
ASTIGMATISM IS MINIMUM
ΔS(ρ) OF ORTHOGONAL CURVE

EXAMPLE 1-2
STABILITY IS REGARDED
AS IMPORTANT
AS

EXAMPLE 1-2
STABILITY IS REGARDED
AS IMPORTANT
PE

COMPARATIVE EXAMPLE 2
PE
MEAN POWER ERROR

EXAMPLE 2-1
RESIDUAL ASTIGMATISM IS MINIMUM
AS

FIG.17 RESIDUAL ASTIGMATISM IS MINIMUM
PE
○:0.1Diopter

EXAMPLE 2-1

RESIDUAL ASTIGMATISM IS MINIMUM

ΔS (ρ) OF ORTHOGONAL CURVE

FIG.19 STABILITY IS REGARDED AS IMPORTANT
AS  l:0.1Diopter

EXAMPLE 2-2
STABILITY IS REGARDED AS IMPORTANT
PE

ASPHERICAL SPECTACLE LENS

BACKGROUND OF THE INVENTION

1. Field of the Invention

The present invention generally relates to a spectacle (or eyeglass) lens having a pair of first and second refractive (or refracting) surfaces (hereunder sometimes referred to simply as first and second surfaces, respectively), one or both of which have aspherical shapes. More particularly, the present invention relates to an astigmatic spectacle-lens (namely, a spectacle lens for correction of astigmatism).

2. Description of the Related Art

It is first supposed that the shape of a curved surface of a spectacle lens is represented by coordinates of a coordinate system shown in FIG. 1. Namely, it is supposed that an optical axis thereof is set as the x-axis of the coordinate system shown in this figure and that the orientation (namely, the positive direction) of the optical axis (or x-axis) is the horizontally rightward direction thereof (as viewed in this figure). In this case, the eye of a spectacle lens wearer (namely, the wearer's line of sight) is directed to the (horizontally) leftward direction. Moreover, the center O' of rotation (or rotation center O') of his or her eye is positioned on the x-axis. Furthermore, the y-axis assumes the vertically upward direction and the z-axis takes a direction determined according to the right-hand rule. Additionally, it is supposed that the origin O of the coordinate system is a point of intersection of the optical axis and a refracting surface. Especially, in the case that no decentration occurs in the spectacle lens, the x-axis coincides with a normal to the refracting surface at the origin thereof.

Astigmatic spectacle-lens is required to employ one or two refracting surfaces (hereunder sometimes referred to as astigmatic surfaces), whose curvatures vary with directions, as one or both of the first and second surfaces thereof. Astigmatic surface is a curved surface whose curvature (namely, a normal curvature) at the origin of a curve (namely, an orthogonal curve or trajectory), which intersects with a plane containing the x-axis (namely, an orthogonal cross-sectional plane) and with the curved surface, changes depending upon an angle $\theta$ of intersection of the orthogonal cross-section plane and an x-y plane. According to differential geometry, a normal curvature $C(\theta)$ is calculated from two principal curvatures (namely, maximum and minimum curvatures of orthogonal trajectories or curves on orthogonal cross-section planes intersecting with each other at right angles) in accordance with the following equation:

$$C_y \cos^2\theta + C_z \sin^2\theta$$

Incidentally, it is supposed that the directions corresponding to these principal curvatures are the y-direction and z-direction, respectively.

Hitherto, a toric surface shown in FIG. 2 has been employed as such an astigmatic surface. Toric surface is a curved surface generated by rotating a curve (namely, a generating line) $x=f(y)$, which extends in the x-y plane, around a line ($x=1/C_z$ and $z=0$), which is employed as an axis of rotation, or is curved surface generated by rotating a curve $x=f(z)$, which extends in an x-z plane, around a line ($x=1/c_y$ and $y=0$), which is employed as an axis of rotation. Incidentally, the curvature of the curve $x=f(y)$ in the case where $y=0$ is $c_y$, and similarly, the curvature of the curve $x=f(z)$ in the case where $z=0$ is $C_z$. Hitherto, mostly, the curves $x=f(y)$ or $x=f(z)$ are circles. Thus, when the principal curvatures $C_y$ and $C_z$ are determined, there are only the following two kinds of refractive surfaces: a curved surface generated by rotating a curve $$x = f(y) = (1/C_y)\left(1 - \sqrt{1 - C_y^2 y^2}\right),$$

which extends in the x-y plane, around the line $x=1/C_z$ and $z=0$, which is employed as an axis of rotation; and a curved surface generated by rotating a curve $$x = f(z) = (1/C_z)\left(1 - \sqrt{1 - C_z^2 z^2}\right),$$

which extends in the x-z plane, around the line $x=1/C_y$ and $y=0$, which is employed as an axis of rotation. In the case that $C_y < C_z$, the former curved surface is of the barrel type (see FIG. 2); and the latter curved surface is of the tire type (see FIG. 3).

In the case of an aspherical spectacle-lens consisting of a spherical surface and a toric surface whose generatix (namely, generating line) is a circle, it is necessary for reducing a residual astigmatism and a mean power error (to be described later) to select a lens, which has a (relatively) large curvature, at the time of designing thereof. As a result, this aspherical lens is thick. This is undesirable from the viewpoint of the beauty of the external appearance thereof.

There has been proposed a technique of forming an axisymmetric (or axially symmetric) surface in the shape of an aspherical surface so as to reduce the astigmatism, thickness and weight of a spectacle lens. For example, in Japanese Unexamined Patent Publication No. 64-40926/1989 Official Gazette, an axisymmetric system is expressed by the following equation:

$$x = (1/kC)\left(1 - \sqrt{1 - kC^2\rho^2}\right) + \sum A_i \rho^{2i}.$$

This is a typical equation that represents an aspherical surface and is effective in the case of an axisymmetric lens but has only a limited effect in the case of an astigmatic lens.

The residual astigmatism and the mean power error (to be described later), which correspond to a direction corresponding to one of the principal curvatures, can be corrected by employing a free curve as the generating line of the toric surface instead of a circle to thereby increase the degree of freedom. However, the orthogonal curved, which corresponds to a direction corresponding to the other principal curvature, is a circle. Thus, a curve having a (relatively) large curvature should be selected so as to correct the residual astigmatism and the mean power error. Although there has been proposed an idea of forming the former refractive surface (namely, the axisymmetric surface) in the shape of an aspherical surface in this case (namely, a method of forming each of the refractive surfaces of the lens in the shape of an aspherical surface), it is difficult to machine each of the refractive surfaces of the lens in such a manner. Additionally, there has been proposed a method of forming each of the refractive surfaces of the lens in the shape of a toric surface (see Japanese Unexamined Patent Publication No. 54-131950 Official Gazette).

To correct the aberration of the lens simultaneously with the correction of astigmatism thereof by a refractive surface thereof, there should be achieved a breakthrough in overcoming difficulties due to the idea of utilization of a toric surface which is a surface of revolution. Namely, there should be utilized a (curved) surface adapted so that not only orthogonal trajectories or curves respectively corresponding to the directions, which respectively correspond to both of the principal curvatures, but also orthogonal trajectories respectively corresponding to other directions are free curves. Prior art techniques for generating such a curved surface are disclosed in Japanese Examined Patent Publication No. 47-23943/1972 Official Gazette, Japanese Unexamined Patent Publication No. 57-10112/1982 Official Gazette and (PCT) International Publication No. WO93/07525 Official Gazette. However, in Japanese Examined Patent Publication No. 47-23943/1972 Official Gazette and Japanese Unexamined Patent Publication No. 57-10112/1982 Official Gazette, no strict mathematic representations of such a free (astigmatic) surface are defined. Thus, such a free surface cannot be realized. Further, in International Publication No. WO93/07525 Official Gazette, such a free astigmatic surface is represented by the following equation (containing variables that are consistent with those of a coordinate system shown in FIG. 1) and equations derived therefrom:

$$x = (C_y y^2 + C_z z^2) / \left\{1 + \sqrt{1 - (1+k_y)C_y y^2 - (1+k_z)C_z z^2}\right\} + \sum_n r^n \left\{\sum_m \sum_j (A_{n,m,j}(y^2/r^2))^m (z^2/r^2)^j\right\}$$

where $r^2 = y^2 + z^2$; and $A_{n \ldots mj}$ denotes predetermined coefficients respectively corresponding to items.

The herein-above described equation is obtained by extending the previously described equation, which represents an axisymmetric surface, in such a manner as to be a two-dimensional one. Free curved surface, which is represented by this equation, assures the continuity of a differential of arbitrary order and meets requirements for correcting the astigmatic conditions of the central portion of the lens, However, the excellent analyzability of this two-dimensional equation causes demerits in designing a lens. For instance, it is necessary for improving aberration conditions at a certain place or portion to change all of the coefficients in this equation. Further, in the process of changing such coefficients, owing to the properties of finite power series, the curved surface is liable to undulate (namely, what is called Runge phenomenon is to occur). Thus, it is difficult to make the power series converge. The degree of difficulty in converging the power series becomes higher with increasing the number of terms of the power series (n, m, l) so as to raise the degree of freedom, Although such difficulty can be alleviated to a certain extend by taking measures, for example, limiting the numerical quantities (or classes) of the coefficients, this does not reach a significant solution.

The present invention is accomplished in view of the aforementioned background.

Accordingly, an object of the present invention is to provide an aspherical spectacle-lens that can minimize the residual astigmatism and the aberration thereof in all of third eye positions (namely, tertiary positions) and can reduce the center thickness and edge thickness thereof.

SUMMARY OF THE INVENTION

To achieve the foregoing object, in accordance with an aspect of the present invention, there is provided as aspherical spectacle-lens (hereunder sometimes referred to as a first aspherical spectacle-lens of the present invention) having a pair of first and second refractive surfaces, both of which have aspherical shapes, wherein the shapes if the first and second curved surfaces are represented by the following equation (1):

$$x(y, z) = \sum_{i=0}^{n_y+m_y-1} \sum_{j=0}^{n_z+m_z-1} c_{i,j} N_{m_y,i}(y) N_{m_z,j}(z) \quad (1)$$

where (x, y, z) represents the coordinates of a point on an aspherical surface and satisfies $(y \in [a, b]) \cap (z \in [c, d])$; $m_y$ is an order of a spline function in the direction of the y-axis (in this case, an integer which is not less than 4); $m_z$ is an order of the spline function in the direction of the z-axis (in this case, an integer which is not less than 4); $n_y$ is the number of inner knots in [a, b] in the direction of the y-axis (in this case, an integer which is not less than 4); $n_z$ is the number of inner knots in [c, d] in the direction of the z-axis (in this case, an integer which is not less than 4); $N_{m_y,i}(y)$ represents an ith $m_y$-th-order normalized B-spline function in the case that knots in the direction of the y-axis are $\xi_0, \xi_1, \xi_2, \ldots, \xi_{ny+2my-1}$ (incidentally, "i" is an integer within $[0, n_y m_y-1]$ and the position of each knot meets the following condition; $\xi_0 \leq \xi_1 \leq \ldots \leq \xi_{my-1} \leq a < \xi_{my} \leq \ldots \leq \xi_{ny+my-1} < b \leq \xi_{ny+my} \leq \ldots \leq \xi_{ny+my+1}$; $N_{m_z,j}(z)$ represents an jth $m_z$-th-order normalized B-spline function in the case that knots in the direction of the z-axis are $\xi_0, \xi_1, \xi_2, \ldots, \xi_{nz+2mz-1}$ (incidentally, "j" is an integer within $[0, n_z+m_z-1]$ and the position of each knot meets the following condition: $\xi_0 \xi_1 \leq \ldots \leq \xi_{mz-1} \leq c < \xi_{mz} \leq \ldots \leq \xi_{nz+mz-1} < d \leq \xi_{nz+mz} \leq \ldots \leq \xi_{nz+2mz-1}$; and $c_{i,j}$ is a coefficient corresponding to the combination of integers "i" and "j").

Further, in the case of an embodiment (hereunder sometimes referred to as a second aspherical spectacle-lens of the present invention) of the first aspherical spectacle-lens of the present invention, the knots and the coefficient are determined so that the aforementioned equation (1) satisfies the following conditions:

x(y, z)=x(y,−z) holds for z $\in$ [−a, a] and/or x(y, z)=x(−y, z) holds for y $\in$ [−c, c].

Furthermore, in the case of an embodiment (hereunder sometimes referred to as a third aspherical spectacle-lens of the present invention) of the second aspherical spectacle-lens of the present invention, the aforementioned b-spline function in the direction of the y-axis, the number of knots, the knots and the coefficient meet the following first or second conditions:

First Condition:

$m_y$ is even; $n_y$ is odd;
$\xi_{(ny+2my-1)/2}=0$, $\xi_0=-\xi_{ny+2my-1}$, $\xi_1=-\xi_{ny+2my-2}, \ldots, \xi_{(ny+2my-3)/2}=-\xi_{(ny+2my+1)/2}$; and $c_{i,j}=c_{mj+nj-1-i),j}$ (incidentally, i=0, 1, ..., $(m_y+n_y-3)/2$) holds for all of "j".

Second Condition:

$m_y$ is odd; $n_y$ is even;
$\xi_0=-\xi_{ny+2my-1}, \xi_1=-\xi_{ny+2my-2}, \ldots, \xi_{(ny+2my-1)/2}=-\xi_{(ny+2my+1)/2}$; and $c_{i,j}=c_{(mj+nj-1-i),j}$ (incidentally, i=0, 1, ..., $(m_y+n_y-3)/2$) holds for all of "j".

Additionally, in the case of an embodiment (hereunder sometimes referred to as a fourth aspherical spectacle-lens of the present invention) of the second or third aspherical spectacle-lens of the present invention, the aforementioned B-spline function in the direction of the z-axis, the number of knots, the knots and the coefficient meet the following first or second conditions:

First Condition:

$m_y$ is even; $n_y$ is odd;

$\xi_{(nz+2mz-1)/2}=0$, $\xi_0=-\xi_{nz+2mz-1}$, $\xi_1=-\xi_{nz+2mz-2}$, ..., $\xi_{(nz+2mz-3)/2}=-\xi_{(nz+2mz+1)/2}$; and $c_{i,j}=c_{i(mj+nj-1-j)}$ (incidentally, $i=0, 1, \ldots, (m_z+n_z-3)/2$) holds for all of "i".

Second Condition:

$m_y$ is odd; $n_y$ is even;

$\xi_0=-\xi_{ny+2mz-1}$, $\xi_1=-\xi_{nz+2mz-2}$, ..., $\xi_{(nz+2mz-1)/2}=-\xi_{(nz+2mz+1)/2}$; and $c_{i,j}=c_{i,(mj+nj-1-j)}$ (incidentally, $i=0, 1, \ldots, (m_z+n_z-3)/2$) holds for all of "i".

In the case of an embodiment (hereunder sometimes referred to as a fifth aspherical spectacle-lens of the present invention) of one of the first to fourth aspherical spectacle-lens of the present invention, which has the ability of correcting residual astigmatism and mean power error in second eye positions (namely, secondary positions) and in third eye positions according to Listing's law, while correcting ametropia (namely, refractive error); spherical degree (power), astigmatic degree in first eye positions (namely, primary positions).

In accordance with another aspect of the present invention, there is provided as aspherical spectacle-lens (hereunder sometimes referred to as a sixth aspherical spectacle-lens of the present invention) whose first surface is a surface of an astigmatic lens having as aspherical shape of the second or fourth aspherical spectacle-lens of the present invention, a line of intersection (namely, an orthogonal curve) of an aspherical surface and an arbitrary plane including an optical axis satisfies the following first and second conditions, thereby correcting residual astigmatism correspondingly to all of lines of sight, which pass through a lens surface, in such a manner as to be minimized:

First Condition:

Lens power D on an optical axis meets the following inequality on an orthogonal cross-section plane: $D>0.0$; and a change in curve-power $\Delta S(\rho)$ takes negative values for arbitrary values of $\rho$ (incidentally, $\rho$ denotes a distance from a predetermined point within a lens range on the orthogonal curve to the optical axis); and Second Condition:

Lens power D on an optical axis meets the following inequality on an orthogonal cross-section plane: $D\leq 0.0$; and a change in curve-power $\Delta S(\rho)$ takes positive values for arbitrary values of $\rho$ (incidentally, $\rho$ denotes a distance from a predetermined point within a lens range on the orthogonal curve to the optical axis).

In accordance with still another aspect of the present invention, there is provided an aspherical spectacle-lens (hereunder sometimes referred to as a seventh aspherical spectacle-lens of the present invention) whose second surface is a surface of an astigmatic lens having an aspherical shape of the second or fourth aspherical spectacle-lens of the present invention, a line of intersection (namely, an orthogonal curve) of an aspherical surface and an arbitrary plane including an optical axis satisfies the following first and second conditions, thereby correcting residual astigmatism correspondingly to all of lines of sight, which pass through a lens surface, in such a manner as to be minimized:

First Condition:

Lens power D on an optical axis meets the following inequality on an orthogonal cross-section plane: $D>0.0.$: and a change in curve-power $\Delta S(\rho)$ takes positive values for arbitrary values of $\rho$ (incidentally, $\rho$ denotes a distance from a predetermined point within a lens range on the orthogonal curve to the optical axis); and Second Condition:

Lens power D on an optical axis meets the following inequality on an orthogonal cross-section plane: $D\leq 0.0$; and a change in curve-power $\Delta S(\rho)$ takes negative values for arbitrary vales of $\rho$ (incidentally, $\rho$ denotes a distance from a predetermined point within a lens range on the orthogonal curve to the optical axis).

In accordance with yet another aspect of the present invention, there is provided an aspherical spectacle-lens (hereunder sometimes referred to as an eighth aspherical spectacle-lens of the present invention) whose first surface is a surface of an astigmatic lens having an aspherical shape of the second or fourth aspherical spectacle-lens of the present invention, a line of intersection (namely, or orthogonal curve) of an aspherical surface and an arbitrary plane including an optical axis satisfies the following condition, there by correcting residual astigmatism correspondingly to all of lines of sight, which pass through a lens surface, in such a manner as to be minimized:

Condition:

Lens power D on an optical axis meets the following inequality on an orthogonal cross-section plane: $-6.0\leq D\leq 6.0$; and a change in curve-power $\Delta S(\rho)$ satisfies the following inequality for $0.0<\rho<4.0$ (incidentally, $\rho$ denotes a distance from a predetermined point within a lens range on the orthogonal curve to the optical axis): $-0.05\leq \Delta S(\rho)\leq 0.05$.

In accordance with yet another aspect of the present invention, there is provided an aspherical spectacle-lens (hereunder sometimes referred to as a ninth aspherical spectacle-lens of the present invention) whose second surface is a surface of an astigmatic lens having an aspherical shape of the second or fourth aspherical spectacle-lens of the present invention, a line of intersection (namely, an orthogonal curve) of an aspherical surface and an arbitrary plane including an optical axis satisfies the following first and second conditions, thereby correcting residual astigmatism correspondingly to all of lines of sight, which pass through a lens surface, in such a manner as to be minimized:

First Condition:

Lens power D on an optical axis meets the following inequality on an orthogonal cross-section: $D>0.0$; and a change in curve-power $\Delta S(\rho)$ takes a positive value at least once for $0.0\leq \rho \leq 10.0$ mm (incidentally, $\rho$ denotes a distance from a predetermined point within a lens range on the orthogonal curve to the optical axis) and $\Delta S(\rho)$ takes negative values for $\rho >10.0$ mm; and Second Condition:

Lens power D on an optical axis meets the following inequality on an orthogonal cross-section plane: $D\leq 0.0$; and a change in curve-power $\Delta S(\rho)$ takes a negative value at least once for $0.0\leq \rho \leq 10.0$ mm (incidentally, $\rho$ denotes a distance from a predetermined point within a lens range on the orthogonal curve to the optical axis) and $\Delta S(\rho)$ takes positive values for $\rho >10.0$ mm.

In accordance with yet another aspect of the present invention, there is provided as aspherical spectacle-lens (hereunder sometimes referred to as a tenth aspherical spectacle-lens of the present invention) whose second surface is a surface of an astigmatic lens having an aspherical shape of the second or fourth aspherical spectacle-lens of the present invention, a line of intersection (namely, an orthogonal curve) of an aspherical surface and an arbitrary plane including an optical axis satisfies the following first and second conditions, thereby correcting residual astigmatism correspondingly to all of lines of sight, which pass through a lens surface, in such a manner as to be minimized:

First Condition:

Lens power D on an optical axis meets the following inequality on an orthogonal cross-section plane: $D\leq 0.0$; and a change in curve-power $\Delta S(\rho)$ takes a negative value at least once for $0.0 \leq \rho \leq 10.0$ mm (incidentally, $\rho$ denotes a distance from a predetermined point within a lens range on the orthogonal curve to the optical axis) and $\Delta S(\rho)$ takes positive values for $\rho > 10.0$ mm; and Second Condition:

Lens power D on an optical axis meets the following inequality on an orthogonal cross-section plane: $D \leq 0.0$; and a change in curve-power $\Delta S(\rho)$ takes a positive value at least once for $0.0 \leq \rho \leq 10.0$ mm (incidentally, $\rho$ denotes a distance from a predetermined point within a lens range on the orthogonal curve to the optical axis), and $\Delta S(\rho)$ takes negative values for $\rho > 10.0$ mm.

Incidentally, B-spline expression or representation of a function will be briefly described hereinbelow.

Generally, a function f(y) defined in an interval $y \in [a, b]$ can be represented by a linear combination of $(n_y + m_y)$ of $m_y$-th-order normalized B-spline functions $N_{m_y,i}$ (i=0, 1, . . . , $n_y+m_y-1$) based on knots $\xi_0, \xi_1, \xi_2, \ldots, \xi_{n_y+2m_y-1}$ as follows:

$$f(y) = \sum_{i=0}^{n_y+m_y-1} c_i N_{m_y,i}(y).$$

Namely, this is referred to as B-spline representation of a function f(y).

Further, $n_y$ knots, which are present within a range (a, b) and satisfy the following inequality:
$\xi_0 \leq \xi_1 \leq \ldots \leq \xi_{m_y-1} \leq a < \xi_{m_y} \leq \xi_{n_y+m_y-1} < b \leq \xi_{n_y+m_y} \leq \ldots \leq \xi_{n_y+2m_y-1}$, are referred to as internal knots.

Furthermore, $m_y$ knots ($\xi_0, \xi_1, \ldots, \xi_{m_y-1}$), which are present within (-b,a], and $m_y$ knots ($\xi_{n_y+m_y}, \mu_{n_y+m_y+1}, \ldots, \xi_{n_y+2m_y-1}$), which are present within (-∞, a] are referred to as additional knots. Moreover, overlapping knots are referred to as multiple knots. When the knots $\xi_0, \xi_1, \xi_2, \ldots, \xi_{n_y+2m_y-1}$ are determined, $(n_y+m_y)$ of $m_y$-th-order normalized B-spline functions $N_{m_y,i}$ (i=0, 1, . . . , $n_y+m_y-1$) based thereon obtainable. FIG. 4 shows a normalized B-spline function in the case that $m_y=4$ and $n_y=6$, that no internal multiple points are present and that additional knots are boundary or frontier points and are quadruple knots.

For example, as shown in FIG. 4, $N_{4,4}(y)$ takes non-zero values for $y \in [\xi_4, \xi_8]$. Similarly, $N_{m_y,i}$ takes non-zero values only within the range of $y \in [\xi_i, \xi_{i+m_y}]$.

Furthermore, such a function f(y) is represented by a polynomial of degree $(m_y-1)$ between adjacent knots, and a derivative of $(m_y-1)$th-order is a constant. Additionally, derivatives of first to $(m_y-2)$th-order are continuous at a single knot. Further, at multiple knots, the highest order of derivatives, the continuity of which is ensured, is lowered. A cusp and an interrupt function can be represented by utilizing this property of multiple knots.

In the case that a function is represented as follows:

$$f(y) = \sum_{i=0}^{n_y+m_y-1} c_i N_{m_y,i}(y),$$

the number of B-spline functions for a given one point y is $m_y$ at most (incidentally, at the multiple knots, the number of B-spline functions is smaller). Therefore, the alteration of the value of a part of the function f(y) can be achieved only by changing the coefficients respectively corresponding to B-spline functions of a limited number, which relate to the neighborhood of the point y. This property is referred to as locality.

Incidentally, a well-known method of obtained $(n_y+m_y)$ of $m_y$-th-order normalized B-spline functions $N_{m_y,i}$ (i=0, 1, . . . , $n_y+m_y-1$) based on the knots $\xi_0, \xi_1, \xi_2, \ldots, \xi_{n_y+2m_y-1}$ is de Boor-Cos's algorithm, the details of which are described in, for example, "Spline Function and Its Application" written by K. Ichikawa and F. Yoshimoto (in Japanese). Additionally, in the present specification, subscripts and superscripts are written in accordance with practices in C language.

In the foregoing description, the B-spline representation of a one-dimensional function has been described. Further, the spline representation of a two-dimensional function can be obtained by extending or expanding the concept or idea of "knots" to the concept of "knot curves" and further defining spline functions in a region surrounded by such "knot curves" and using a linear combination of such spline functions. The aforementioned equation (1) is expanded into a two-dimensional equation by assuming the "knot curves" as straight lines which parallel with coordinate axes, respectively, and further representing a spline function in a region, which is surrounded by such "knot curves", in terms of a product of one-dimensional B-spline functions respectively corresponding to the coordinate axis (of, for example, ordinate and abscissa).

Spline expressions or representations have locality. Therefore, in the case of employing spline expressions, a change in the shape of a certain part hardly affects those of other parts. Moreover, occurrences of undesirable undulations in a curved surface can be prevented by suitably selecting knots. These features are very significant for designing lenses. Further, spline expressions are superior to power-series expressions in these respects or features. However, power-series expressions are superior to spline expressions in analyticity. In the case of an mth-order spline interpolation function, the highest-order one of derivatives, the continuity of which is ensured, is an (m−2)th-order derivative. It is, however, sufficient for the refracting surfaces of a spectacle lens that the continuity of a second order derivative is ensured. Thus, it is suitable for the design of the refracting surfaces of a spectacle lens to use the spline expression in the case that $m \geq 4$. If m is large, a resultant curved-surface is smooth, while the locality is degraded. Moreover, a burden put on a computer is increased. Thus, there is no need for employing an excessively large number as the order m of the spline function. According to the inventor of the present invention, his experience shows that an appropriate value for m is 5 or 6. Further, the number of knots is closely related to the degree of freedom in designing a lens, namely, to the ability of correcting aberration. The ability of correcting aberration becomes higher with increase in the number of the coefficients c (which is {(the number n of internal knots)+(the order m of the spline function)} in the case of a one-dimensional expression, and is a product of the numbers, which respectively correspond to the coordinate axes, of the coefficients in the case of a two-dimensional expression). However, there is no necessity for employing an excessively large value as the degree of the ability of correcting aberration. Further, an increase in the ability of correcting aberration, which is caused as a result of an increase in the number (m+n) of the coefficients c (incidentally, in the case of the two-dimensional expression, the number of the coefficients c is $(m_y+n_y)(m_z+n_z)$) by one, is rapidly reduced with an increase in the number (m+n). This convergence rate concerning the number of the coefficients c is a characteristic feature of the spline function. The inventor's experience shows that the appropriate number (m+N) corresponding to each of the coordinate axes is within a range of 9 to 15 or so (depending on the diameter and power of the lens)

The refracting surfaces, by which the correction of astigmatism is achieved, of the aspherical spectacle-lens is symmetric with respect to both of principal axis. The second aspherical spectacle-lens of the present invention relates to this symmetry. Further, the third and fourth aspherical spectacle-lenses of the present invention relate to the practical methods of selecting the knots and the coefficients so as to assure this symmetry in the case of employing B-spline expression.

The fifth aspherical spectacle-lens of the present invention relates to the correction of residual astigmatism and mean power error at the third eye positions, which is another characteristic feature of the present invention. The term "first eye position" (namely, the primary position) designates a condition of an eye in the case that the (primary) line of sight coincides with the x-axis of the coordinate system of the present invention (see FIG. 1). Further, the term "second eye position" (namely, the secondary position) denotes a condition of an eye in which the line of sight is only within the x-y plane or the x-z plane. Further, the "third eye position" represents a condition of an eye when the line of sight is directed to an oblique direction that is other than the directions of the line of sight in the case of the first and second eye positions. Eyeball (or eyeglobe) with no astigmatism is rotationally symmetric with respect to the x-axis. Arbitrary third eye position is considered as being equivalent to the second eye position. In the case that astigmatism occurs in the eyeball, such a view is not taken. This is because a direction corresponding to each of the coordinate axes of the coordinate system x-y'-z', that is, the direction of the line of sight of the eyeball on the coordinate point, (see FIG. 1) is significant for the eyeball after rotated to the arbitrary third eye position. Assuming that a straight line passing through the center of rotation, which is parallel to the y-axis, is designated as the y'-axis and that a straight line passing through the center of rotation, which is parallel to the z-axis, is designated as the z'-axis, a line of sight is directed to a certain oblique direction by combining the rotation of the eyeball around the y'-axis with the rotation thereof around the z'-axis. However, when the eye reaches the third eye position from the first eye position through different paths, all of the resultant direction corresponding to each of the coordinate axes of the coordinate system x-y'-z' are not the same as the correct direction corresponding to each of the coordinate axes of the coordinate system x-y'-z'. There is only one correct direction. Law or rule for determining only a single correct direction is Donder-Listing law. According to this law, in the case that an eyeball reaches a specific third eye position from a first eye position by rotating around a straight line passing through the center of rotation placed in a y'-z' plane (referred to generally as a Listing plane), no torsion or rolling (namely, a rotation thereof around the x-axis) occurs. There is only one straight line, which acts as such an axis of rotation, in the Listing plane. Further, there is only one angle of rotation, by which the eyeball is rotated to the specific third eye position. Thus, the directions respectively corresponding to the coordinate axes of the coordinate system x-y'-z' are completely determined.

The aforesaid discussion has been conducted on condition that the astigmatic axes (extending in the directions in the principal curvatures) coincide with the y- and z-axes, respectively. It is, however, obvious that even in the case that as astigmatic axis extends obliquely, no inconsistency occurs if the eyeball is rotated in accordance with the Donder-Listing law. Incidentally, regarding the Donder-Listing law, refer to, for example, "Physiology of Eyes" edited by A. Ogiwara (published by Igaku-Shoin, 1966)

A part of an aspherical lens, through which the line of sight in this third eye position passes through, should be designed in such a manner as to correct the power and astigmatic component in the case of an occurrence of a refractive error of eyes. However, past patents have shown only graphs illustrating aberrations in both of the directions of the astigmatic axes. Moreover, there are no description, which are taken as considering aberrations in an arbitrary third eye position, in the past patents.

In accordance with the present invention, the shapes of astigmatic surfaces can be designed in such a manner as to correct the power and astigmatic component in the case of an occurrence of a refractive error of eyes in all eye positions on the base of the directions of the astigmatic axes determined by the Donder-Listing law.

Although a portion (in the vicinity of a point P shown in FIG. 1) of the lens, which intersects with principal rays (a light beam coinciding with the x-axes rotation) when the eyes are directed to the arbitrary third eye position, should be essentially designed in such a way as to completely correct the power and astigmatic component in the case of an occurrence of a refractive error of eyes, only a part of the power and astigmatic component can be actually achieved. The remaining uncorrected part thereof is referred to as a residual aberration. Incidentally, the definitions of the residual astigmatism and the mean power error will be described hereinafter.

It is assumed that a spherical surface which has the center at the center O' of rotation and also has a radius OO' (see FIG. 1) is a reference spherical surface. In this figure, reference character O denotes a vertex of the second surface. In the first eye position, an incident wave surface (or plane) coming from an object at infinity is refracted by the lens. Further, an output wave surface at the vertex is a quadratic surface represented by the following quadratic approximate expression:

$$x = \tfrac{1}{2} D_y y^2 + \tfrac{1}{2} D_z Z^2$$

where $D_y$ denotes a value of the refractive error in the y-direction; and $D_z$ a value of the refractive error in the z-direction. Further, the directions of the astigmatic axes are the directions of the y-axis and the z-axis. When the eyes are directed to a certain third eye position, an incident wave surface (or plane), which similarly comes from an object at infinity, is refracted by a predetermined portion (namely, a portion intersecting with the principal ray) of the lens. Moreover, a wave surface or front at the point O of intersection between the principal ray and the reference aspherical surface is a quadratic surface which is ideally represented by the following quadratic approximate expression, similarly as in the case of the first eye position, in the coordinate system established after the rotation performed in accordance with the Donders-Listing law:

$$x = \tfrac{1}{2} D_y y^2 + \tfrac{1}{2} D_z z^2$$

However, actually, this wave surface is presented by the following quadratic expression:

$$x = \tfrac{1}{2} D'_y y^2 + \tfrac{1}{2} D'_z z^2 + D'_{yz} yz.$$

This wave surface can be represented by the following expression as a result of a certain coordinate transformation:

$$x = \tfrac{1}{2} D''_y y''^2 + \tfrac{1}{2} D''_z z''^2$$

Incidentally, the y"-axis is obtained by turning the y-axis toward the z-axis by angle δ. Further, the z"-axis is orthogonal to the y"-axis. Furthermore, it can be proved by a simple mathematical calculation that the following equations hold:

$$\text{Tan } 2\delta = 2D'_{yz}/(D'_y - D'_z)$$

$$D''_y = D'_y \cos^2 \delta + 2D'_{yz} \sin \delta \cos \delta + '_z \sin^2 \delta$$

$$D''_z = D'_z \cos^2 \delta - 2D'_{yz} \sin \delta \cos \delta + D'_z \sin^2 \delta$$

Namely, the direction of the principal axis and both of the principal curvatures of the actual wave surface change from those of an ideal wave surface. The difference between the actual wave surface and the ideal wave surface, namely, the aberration wave surface is a quadratic surface represented by the following expression:

$$x = \left[\frac{1}{2}D'_y y^2 + \frac{1}{2}D'_z z^2 + D'_{yz} yz\right] - \left[\frac{1}{2}D_y y^2 + \frac{1}{2}D_z z^2\right] = \frac{1}{2}\Delta_y y\Delta^2 + \frac{1}{2}\Delta_z z\Delta^2$$

Incidentally, the description of expressions for calculating $\Delta_y$, $\Delta_z$ and the angles in the $y^\Delta$- and $z^\Delta$-directions is omitted herein. However, the residual astigmatism As is defined by:

$$AS = |\Delta_y - \Delta_z|;$$

and
The mean power error PE is defined by:

$$PE = \frac{1}{2}(\Delta_y + \Delta_z).$$

Unfortunately, it is impossible to completely correct the power of ametropia and astigmatic component of a refractive error in all eye positions. A feature of this invention is to distribute the ametropia component, that is, the residual astigmatism AS and the mean power error PE, difficult to correct each eye position by taking some design conception. One possible distribution is to completely correct the residual astigmatism AS. In this case, although difficulty is encountered to completely correct the mean power error PE, it is expectable that the adjusting function of eyes covers the difficulty of the complete correction. This is one of characteristic features of the sixth and seventh aspherical spectacle-lenses of the present invention.

Aspherical lenses often encounter the problem that the optical performance thereof is deteriorated when the spectacle-lens is worn in a condition where the lenses are slightly decentered or eccentric, namely, the problem that the stability in the optical performance thereof is low during a wearer wears the spectacle-lens in such a condition. In accordance with the present invention, the aspherical spectacle-lens is designed by considering aberrations, which occur during worn by a wearer in the slightly decentered condition, in such a manner as to prevent the optical performance thereof from being deteriorated. Namely, the aspherical spectacle-lens is designed by regarding what is called the wearing stability (namely, the stability in the optical performance thereof during worn by a wearer) as important. This is one of the characteristic aspects of the eighth, ninth and tenth aspherical spectacle-lenses of the present invention. In short, in the case of these aspherical spectacle-lenses of the present invention, the curvature of the surface of the central portion thereof is stabilized.

Incidentally, several concepts are introduced so as to explain the features of the shapes of the lenses of the present invention. It is assumed that a plane including the optical axis thereof is an orthogonal cross-section plane (incidentally, an angle of intersection between this plane and the x-y plane is θ), that the line of intersection between the orthogonal cross-section plane and each of the first and second surfaces is an orthogonal curve and that this orthogonal curve is represented by: s=f(ρ) where ρ is the distance from a predetermined point on this curve to the optical axis. Thus, the refractive power of the curve is given by:

$$S(\rho) = (n_e - 1)\frac{f''(\rho)}{[1 + (f'(\rho))^2]^{3/2}}$$

(incidentally, $n_c$ is a line refractive index). Therefore, the lens power D on the optical axis on the orthogonal cross-section plane is defined as follows:

$$D = \frac{1}{1 - \frac{t}{n_e}S_1(0)}S_1(0) - S_2(0)$$

(incidentally, t designates a center thickness of the lens). Furthermore, a change Δs(ρ) in the refractive power of the orthogonal curve is defined as follows:

$$\Delta S(\rho) = S(\rho) - S(O).$$

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Incidentally, although the present invention relates mainly to astigmatic lenses, it is impracticable to present embodiments respectively corresponding to all of the combinations of spherical powers, astigmatic powers, a front astigmatic surface and a rear astigmatic surface. Therefore, examples of a plus lens and a minus lens, each of which has a corresponding one power, will be presented hereinbelow. In the case of each of the plus lens and the minus lens, the first surface is a spherical surface, and the second surface is an astigmatic surface. Further, correspondingly to each power, an example of a conventional spherical toric surface (which is not within the scope of the present invention and is presented for comparison), an example of a lens of the present invention, which minimizes the residual astigmatism thereof, and an example of a lens of the present invention, which is designed by regarding what is called the wearing stability (namely, the stability in the optical performance thereof) during worn by a wearer) as important, will be presented hereinbelow. Needless to say, the present invention is not limited to the embodiments or examples. Further, the following data and diagrams will be shown correspondingly to each of the embodiments of the present invention:

1. Design Data
2. Residual Astigmatism Distribution Diagram
3. Mean Power Error Distribution Diagram
4. Diagram Showing ΔS(ρ)-Distribution Correspondingly to Orthogonal Curve and to Each of 5 Angles
5. Enlarged Diagram showing Central Portion of ΔS(ρ)-Distribution Correspondingly to Orthogonal Curve and to Each of 5 Angles

EMBODIMENT 1

This embodiment is an example of making an astigmatic lens based on the basic design data listed in the following TABLE 1.

TABLE 1

| | |
|---|---|
| Prescribed Value | S − 3.00, C − 2.00 |
| Outside Diameter | 75 mm |
| Center Thickness | 1.3 mm |
| Refractive Index | 1.501 |
| First Curvature | $9.975719988 \times 10^{-4}$ mm$^{-1}$ (S = 0.49978D) |
| Second Curvature | $C_y = 1.097804391 \times 10^{-2}$ mm$^{-1}$ ($S_y$ = 5.5D) |
| | $C_y = 6.986027944 \times 10^{-2}$ mm$^{-1}$ ($S_y$ = 3.5D) | a. Curved Surface by Conventional Technique (Comparative Example 1)

According to the conventional technique, the second surface is (a kind of) a toric surface. Namely, this curved surface is obtained by rotating a circular curve in the x-y plane, which is given by:

$$x = f(y) = \frac{1}{C_y}\left(1 - \sqrt{1 - C_y^2 y^2}\right)$$

around a straight line which serves as an axis of rotation and is given by:

$x = 1/C_z$ and $z = 0$.

Figure 1:
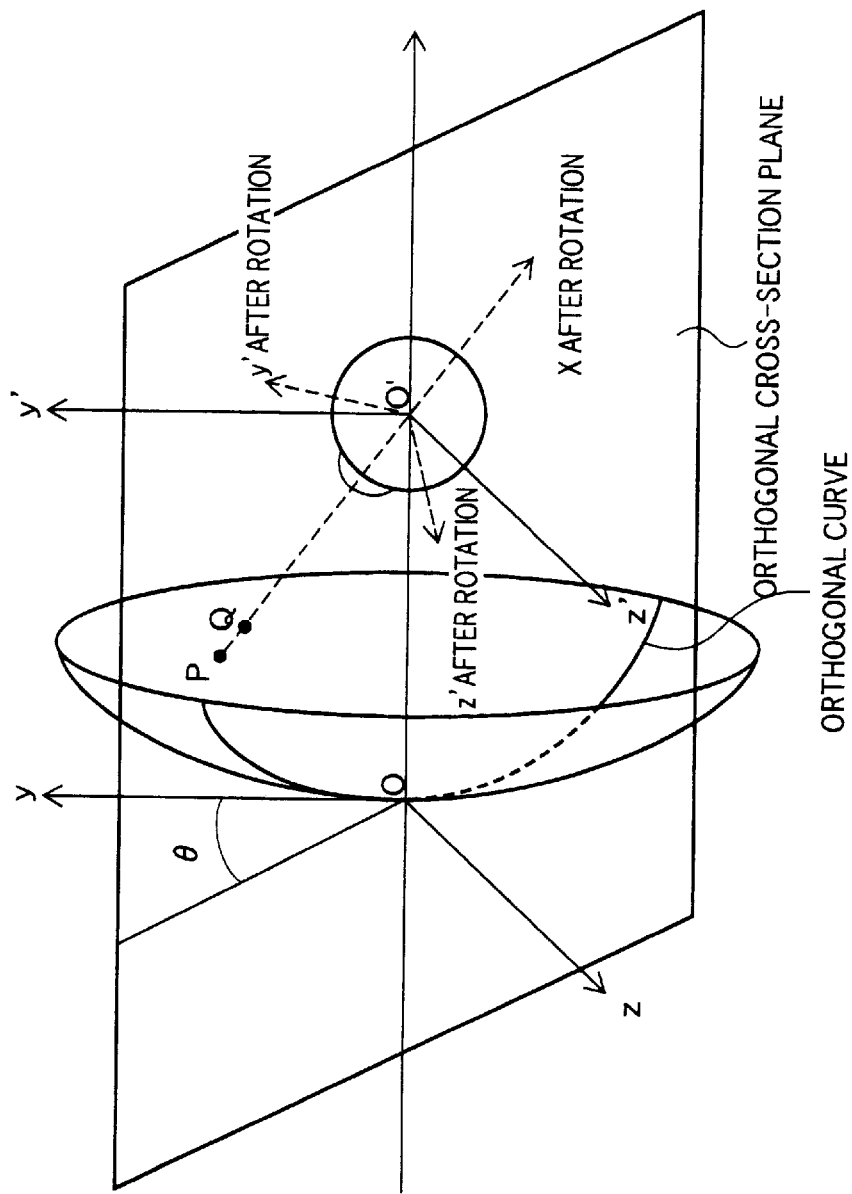
FIG. 1 is a diagram illustrating a coordinate system for showing the shape of a curved surface of a spectacle-lens.
Figure 2:
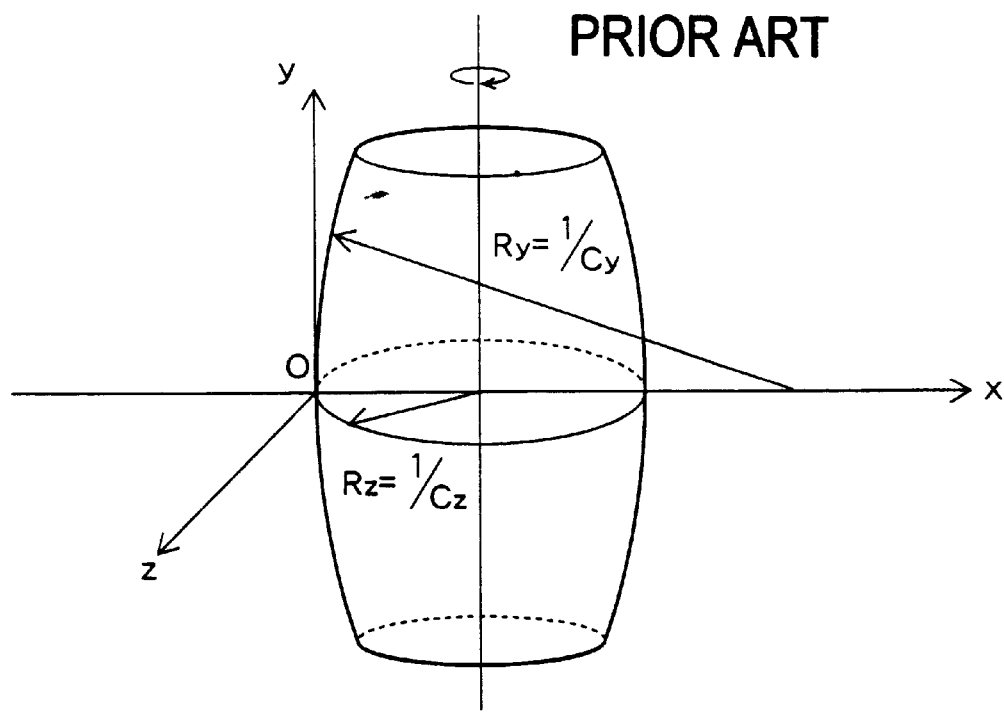
FIG. 2 is a diagram illustrating a toric surface of the barrel type.
Figure 3:
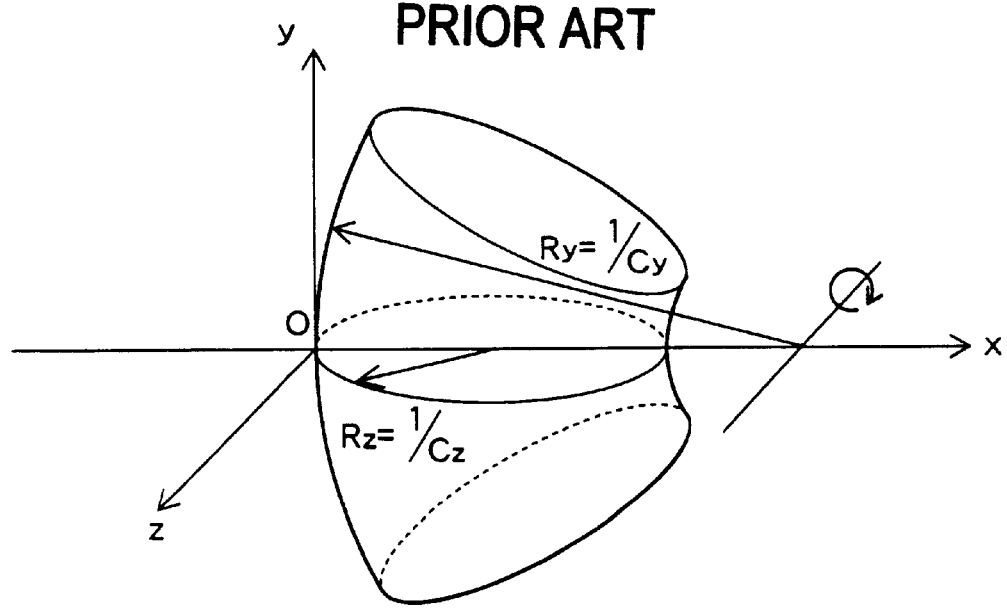
FIG. 3 is a diagram illustrating a toric surface of the tire type.
Figure 4:
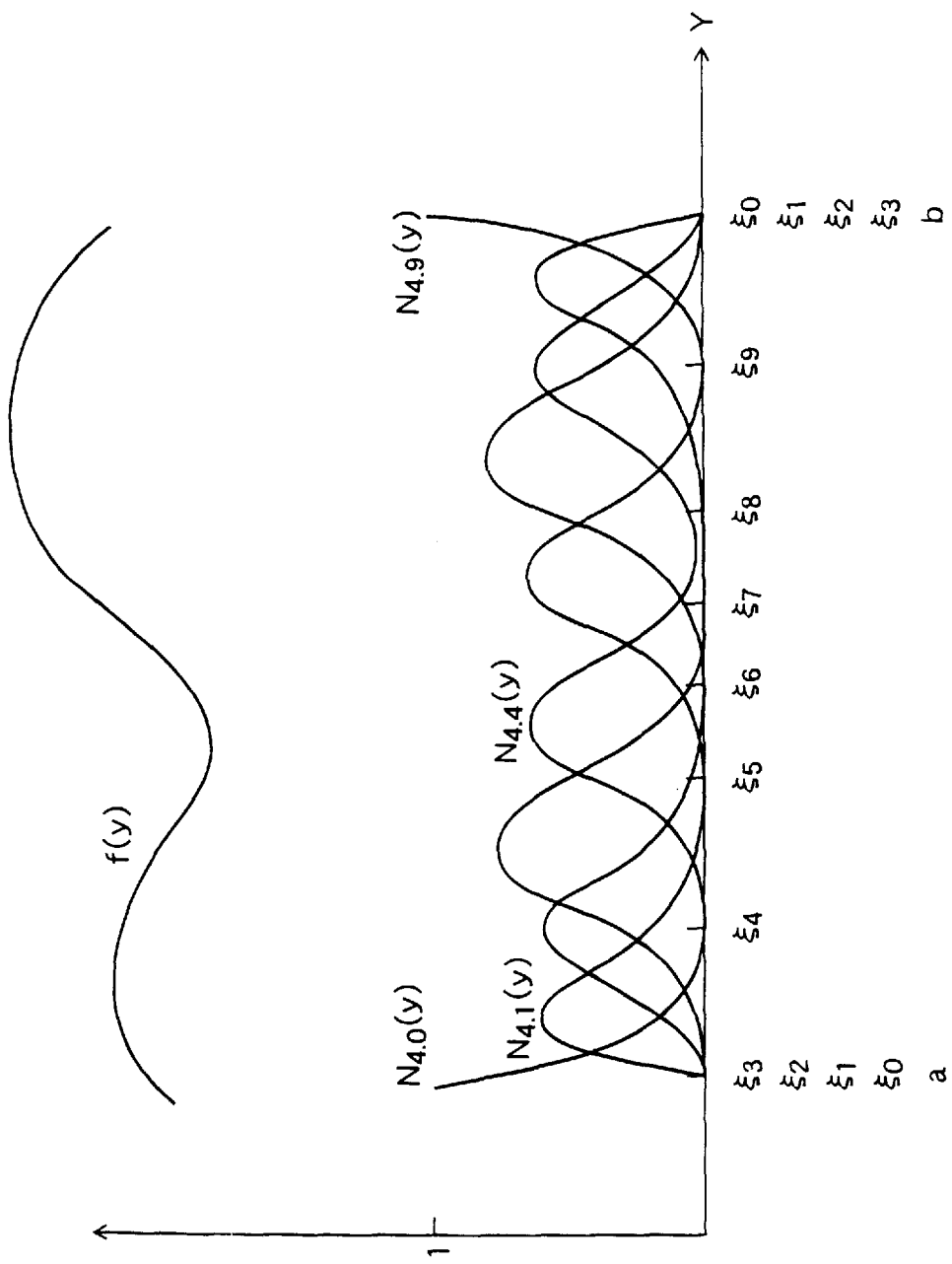
FIG. 4 is a diagram illustrating an example of B-spline function.
Figure 5:
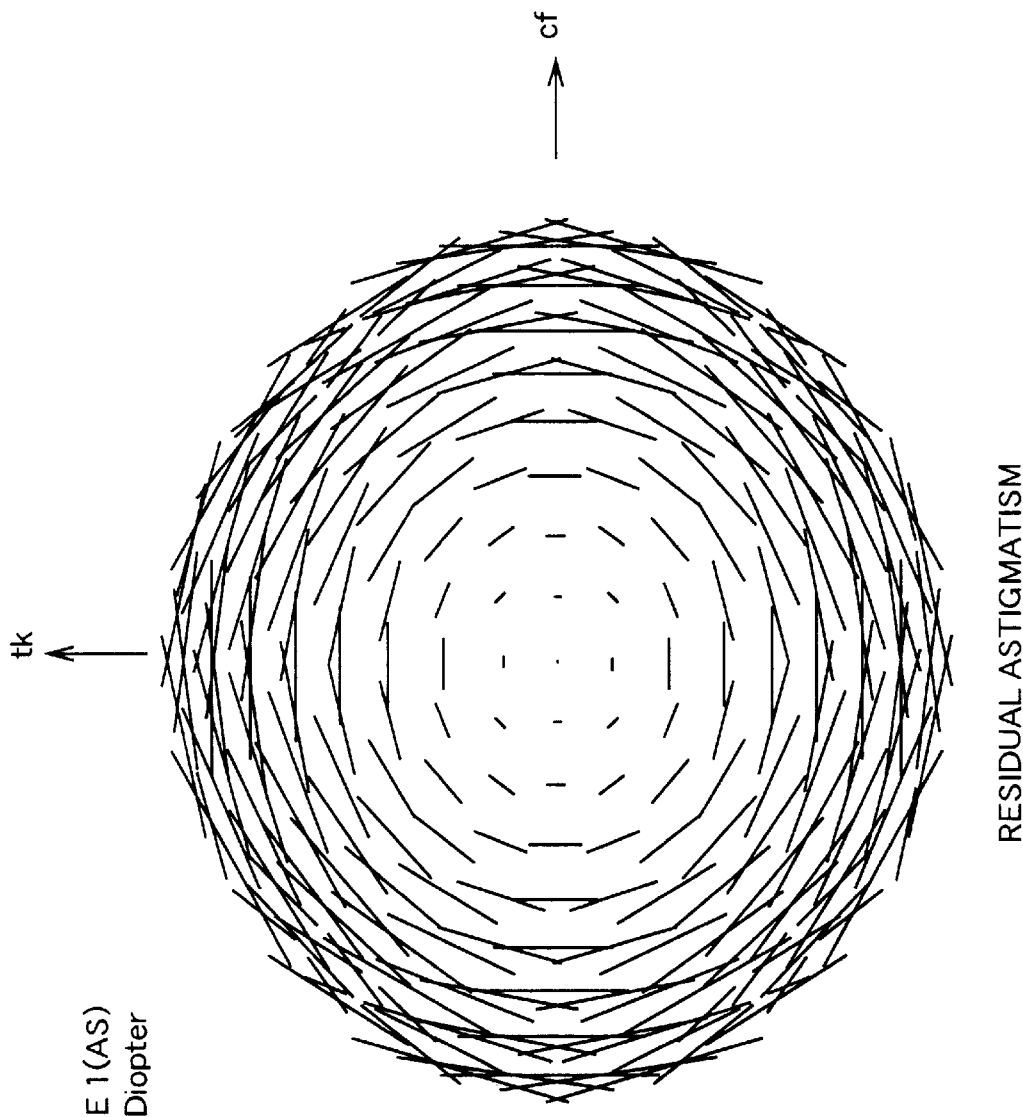
FIG. 5 is a diagram showing the distribution of residual astigmatism in Comparative Example 1, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the length of a segment, whose middle point is each of the discrete points, is proportional to the value of residual astigmatism, and moreover, the direction of such a segment indicates the direction corresponding to a principal curvature which is a larger one of the signed curvatures of an aberration surface, and the segment drawn at the upper left part of this figure indicates the length of 0.1 Diopters.
Figure 6:
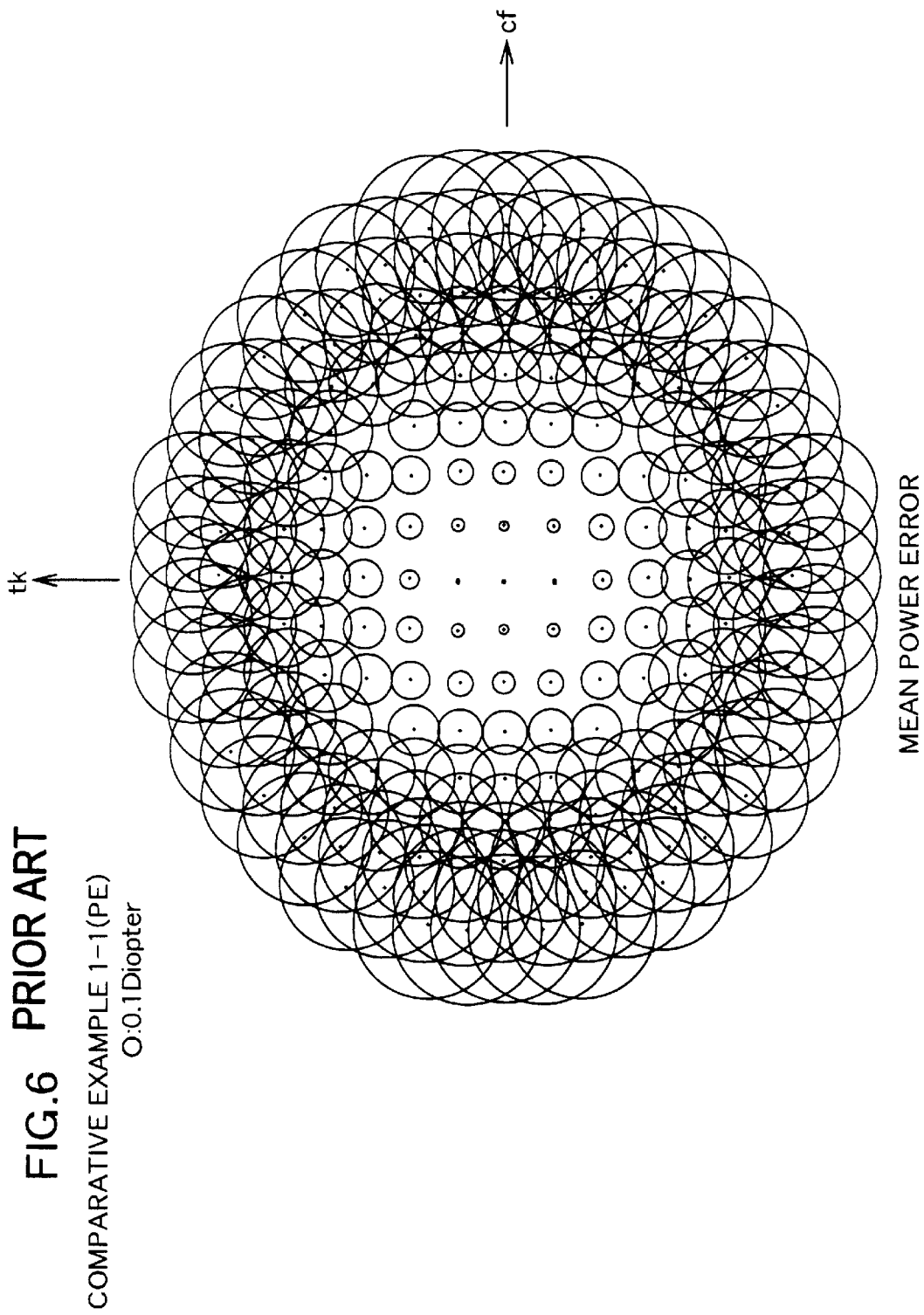
FIG. 6 is a diagram illustrating the distribution of means power errors in each of the eye positions in Comparative Example 1, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sample at intervals of tan 10° and include 0.0, and the degree of unevenness of such values indicates the degree of distortion aberration, and further, the diameter of a circle, whose middle point is each of the discrete points, is proportional to the absolute value of a mean power error, and moreover, white circles indicate negative mean power errors and black circles indicate positive power errors, and the white circle drawn at the upper left part of this figure indicates −0.1 Diopters.

In this case, $C_y > C_z$, so that this curved surface is a "tire surface". Further, as above described, this curved surface is a kind of a toric surface. Thus, there is no parameter other than basic design data. FIG. 5 is a diagram illustrating the residual astigmatism in the case of Comparative Example 1. FIG. 6 is a diagram showing the mean power error in the case of Comparative Example 1. In each of these figures, the axis of abscissa and the axis of ordinate respectively represent the value of cf and the value of tk in the direction of the principal light ray outputted or emitted from the lens when a wearer's eye is directed to a predetermined third eye position (namely, the direction of the x-axis after the rotation of the eye ball). Further, the value of cf (namely, cf-value) is the value of a tangent of an angle between the projection of the light ray onto the x-z plane and the x-axis. Furthermore, the value of tk (namely, the tk-value) is the value of a tangent of an angle between the projection of the light ray onto the x-y plane and the x-axis. Moreover, when the direction cosine of the principal light ray tentatively outputted from the lens is taken as (cos α, cos β, cos γ), tk- and cf-values are tk=cos β/cos α, cf=cos γ/cos α. It is impossible to represent the residual astigmatism and the mean power error in all of the third eye positions. Therefore, it is assumed that the tangents cf and tk take discrete values and that the residual astigmatism and the mean power error are represented by using the value of aberration at each discrete point. The cf- and tk-values taken correspondingly to the outing light direction are equivalent to cf- and tk-values in the direction of the incident light which are sampled at an interval of tan 10° and including 0.0. The cf- and tk-values of the incident light are positioned on the square lattice points. In contrast, in the case of the outgoing light, points, whose coordinate values are the cf-value and the tk-value, are nonuniformly arranged on the cf-tk plane. The degree of this nonuniformity indicates the degree of distortion aberration. FIGS. 5 and 6 aid in grasping the degree of distortion aberration in addition to the residual astigmatism and the mean power error.

In FIG. 5, a segment is indicated at each discrete point. The values of the coordinates of the midpoint of the segment are the cf-value and the tk-value, respectively, in the direction of a predetermined outgoing light ray. The length of the segment is proportional to the value of the residual astigmatism. The direction of the segment indicates the direction corresponding to the principal curvature that is a larger (signed) one of the curvatures of an aberration wave surface.

In FIG. 6, a circle is indicated at each discrete point. The values of the coordinates of the center of the circle are the values of the tangents cf and tk-value in the direction of a predetermined outgoing light ray or beam. The radius of the circle is proportional to the absolute value of mean power error. White circles indicate that the mean power error is negative, whereas black circles indicate that the mean power error is positive. The foregoing description of a diagram, which shows the aberration, is in common among this Example and other Examples.

The design of a toric surface having a slight curve in this manner cannot possibly be employed because high aberration is caused in such a toric surface portion. The following two Examples are obtained by forming the second surface, which is an astigmatic surface, as an aspherical surface in order to correct the aberration.

b. Example in Case of Minimum Residual Astigmatism (Example 1-1)

In the case of an aspherical spectacle-lens that is Example 1-1 according to the present invention, the second surface is represented by a two-dimensional spline expression. Further, the following parameters are used in this Example. Regarding the meaning of the parameters or variables, refer to the foregoing description of the equations (1).

Figure 7:
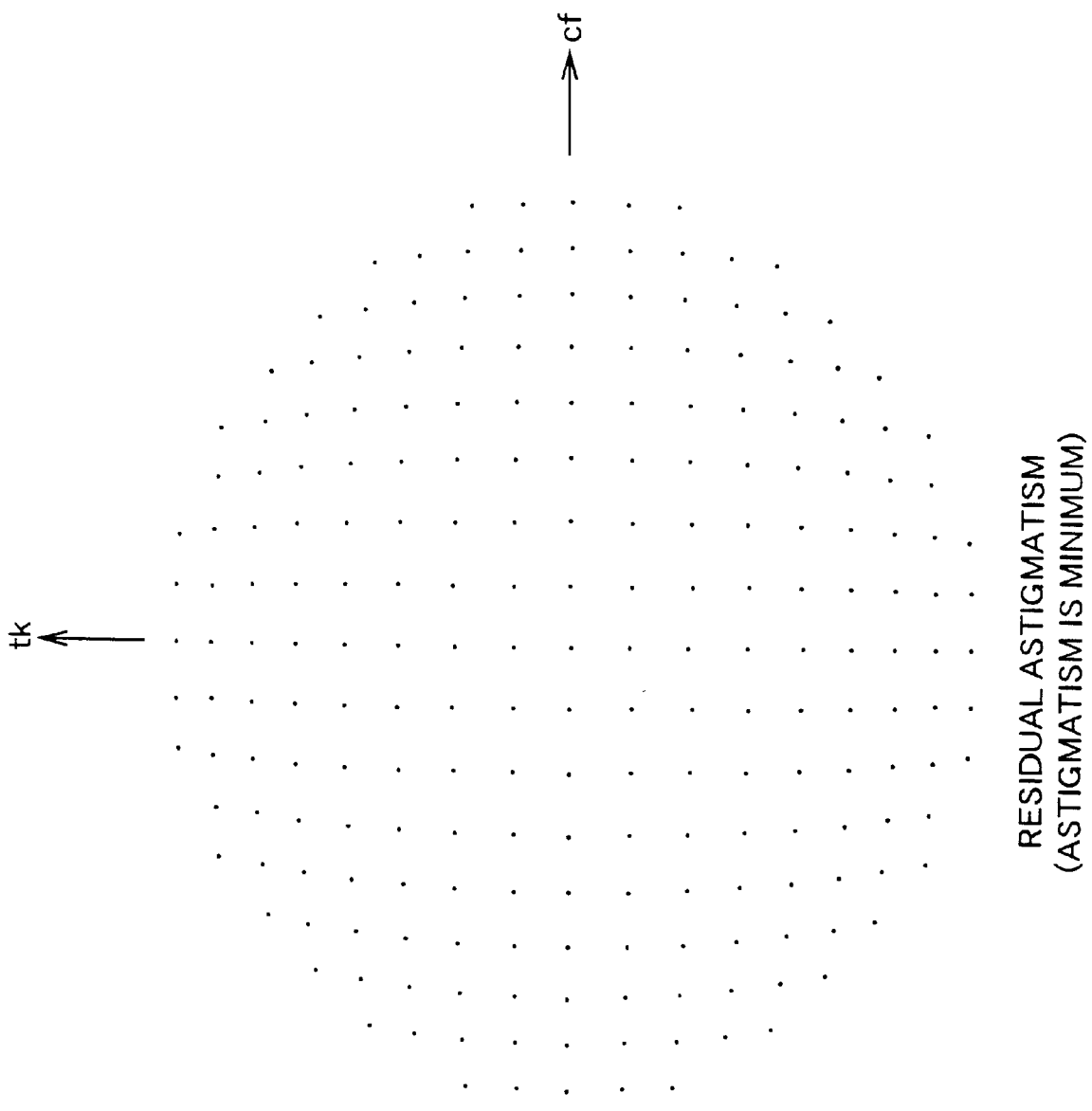
FIG. 7 is a diagram showing the distribution of residual astigmatism in each of the eye positions in an example of minimum residual astigmatism in the case of Example 1-1, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the length of a segment, whose middle point is each of the discrete points, is proportional to the value of residual astigmatism, and moreover, the direction of such a segment indicates the direction corresponding to a principal curvature which is a larger one of the signed curvatures of an aberration surface, and the segment drawn at the upper left part of this figure indicates the length of 0.1 Diopters.
Figure 8:
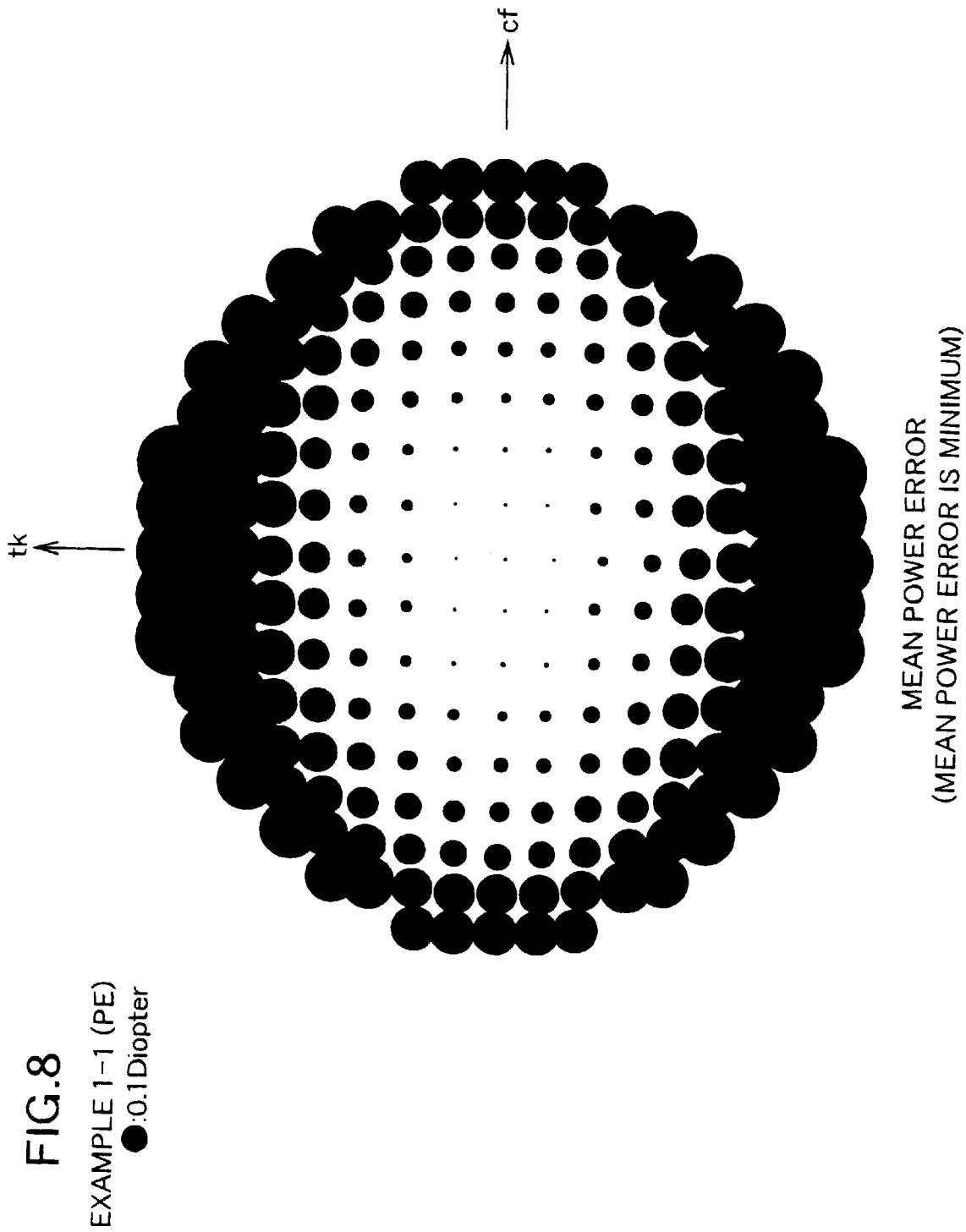
FIG. 8 is a diagram showing the distribution of mean power errors in each of the eye positions in an example of minimum residual astigmatism in the case of Example 1-1, in which the axis of abscissa represents the cf-value (namely, the value of a tangent of an angle between the projection of the light ray onto the x-z plane and the x-axis of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the diameter of a circle, whose middle point is each of the discrete points, is proportional to the absolute value of a mean power error, and moreover, white circles indicate negative mean power errors and black circles indicate positive power errors, and the white circle drawn at the upper left part of this figure indicates −0.1 Diopters.

$m_y=6$, $n_y=5$, $a=-45.0$, $b=45.0$
$m_z=6$, $n_z=5$, $a=-45.0$, $b=45.0$
$\xi_0=\xi_1=\xi_2=\xi_3=\xi_4=\xi_5=-45.0$
$\xi_6=-14.9859957733$, $\xi_7=-6.52300169973$, $\xi_8=0.0$,
$\xi_9=6.523016973$, $\xi_{10}=14.985957733$,
$\xi_{11}=\xi_{12}=\xi_{13}=\xi_{14}=\xi_{15}=\xi_{16}=45.0$
$'_0='_1='_2='_3='_4='_5=-45.0$
$'_6=-14.9859957733$, $'_7=-6.52300169973$, $'_8=0.0$,
$'_9=6.523016973$, $'_{10}=14.985957733$,
$'_{11}='_{12}='_{13}='_{14}='_{15}='_{16}=45.0$
$c_{0,0}=c_{0,10}=c_{10,0}=c_{10,10}=2.0394022792\times10^{01}$
$c_{0,1}=c_{0,9}=c_{10,1}=c_{10,9}=2.098568142\times10^{01}$
$c_{0,2}=c_{0,8}=c_{10,2}=c_{10,8}=1.062125569\times10^{01}$
$c_{0,3}=c_{0,7}=c_{10,3}=c_{10,7}=1.010302225\times10^{01}$
$c_{0,4}=c_{0,6}=c_{10,3}=c_{10,7}=9.412240951\times10^{00}$
$c_{0,5}=c_{10,5}=9.168813000725\times10^{00}$
$c_{1,0}=c_{1,10}=c_{9,0}=c_{9,10}=1.45966728\times10^{01}$
$c_{1,1}=c_{1,9}=c_{9,1}=c_{9,9}=9.601231119\times10^{01}$
$c_{1,2}=c_{1,8}=c_{9,2}=c_{9,8}=8.9539115658\times10^{01}$
$c_{1,3}=c_{1,7}=c_{9,3}=c_{9,7}=7.977584443218\times10^{01}$
$c_{1,4}=c_{1,6}=c_{9,3}=c_{9,7}=7.114245805\times10^{00}$
$c_{1,5}=c_{9,5}=6.9477473466\times10^{00}$
$c_{2,0}=c_{2,10}=c_{8,0}=c_{8,10}=8.77397719787\times10^{00}$
$c_{2,1}=c_{2,9}=c_{8,1}=c_{8,9}=8.12224295989\times10^{00}$
$c_{2,2}=c_{2,8}=c_{8,2}=c_{8,8}=6.782603407\times10^{01}$
$c_{2,3}=c_{2,7}=c_{8,3}=c_{8,7}=5.550078881501\times10^{01}$
$c_{2,4}=c_{2,6}=c_{8,4}=c_{8,6}=4.74633359932\times10^{00}$
$c_{2,5}=c_{8,5}=4.510131527\times10^{00}$
$c_{3,0}=c_{3,10}=c_{7,0}=c_{7,10}=7.357562898\times10^{01}$
$c_{3,1}=c_{3,9}=c_{7,1}=c_{7,9}=5.968870360\times10^{01}$
$c_{3,2}=c_{3,8}=c_{7,2}=c_{7,8}=4.637670872\times10^{01}$
$c_{3,3}=c_{3,7}=c_{7,3}=c_{7,7}=3.338003591\times10^{01}$
$c_{3,4}=c_{3,6}=c_{7,4}=c_{7,6}=2.3702055909\times10^{00}$
$c_{3,5}=c_{3,5}=2.11518918\times10^{00}$
$c_{4,0}=c_{4,10}=c_{6,0}=c_{6,10}=5.8189226618\times10^{00}$
$c_{4,1}=c_{4,9}=c_{6,1}=c_{6,9}=4.5811075205\times10^{00}$
$c_{4,2}=c_{4,8}=c_{6,2}=c_{6,8}=3.1318388590\times10^{00}$
$c_{4,3}=c_{4,7}=c_{6,3}=c_{6,7}=1.6955474673\times10^{00}$
$c_{4,4}=c_{4,6}=c_{6,4}=c_{6,6}=5.686557369\times10^{-01}$
$c_{4,5}=c_{4,5}=2.609922213505\times10^{-01}$
$c_{5,0}=c_{5,10}=5.502453128\times10^{00}$
$c_{5,1}=c_{5,9}=4.188356934\times10^{00}$
$c_{5,2}=c_{5,8}=2.728057940\times10^{00}$
$c_{5,3}=c_{5,7}=1.257050571\times10^{00}$
$c_{5,4}=c_{5,6}=8.027906654\times10^{-02}$
$c_{5,5}=-2.446621961\times10^{-01}$ FIG. 7 shows the distribution of residual astigmatism obtained when a wearer of the spectacle-lens of Example 1-1 directs his eyes along each line of sight. Further, FIG. 8 shows the distribution of mean power error obtained when a wearer of the spectacle-lines of Example 1-1 directs his eyes along each line of sight. In the case of this example, the residual astigmatism is corrected in such a manner as not to be more than 0.01 Diopters (1/m) for all of lines of sight that pass through the lens (range).

In FIG. 7, segments indicating the magnitude of the residual astigmatism are represented by points at all discrete points. However, in the peripheral portion, there still remain some large man value errors. It is clear that, in the case of "Example 1-1" the condition of aberration is extremely improved in comparison with the toric lens of "Comparative Example 1".

Figure 9:
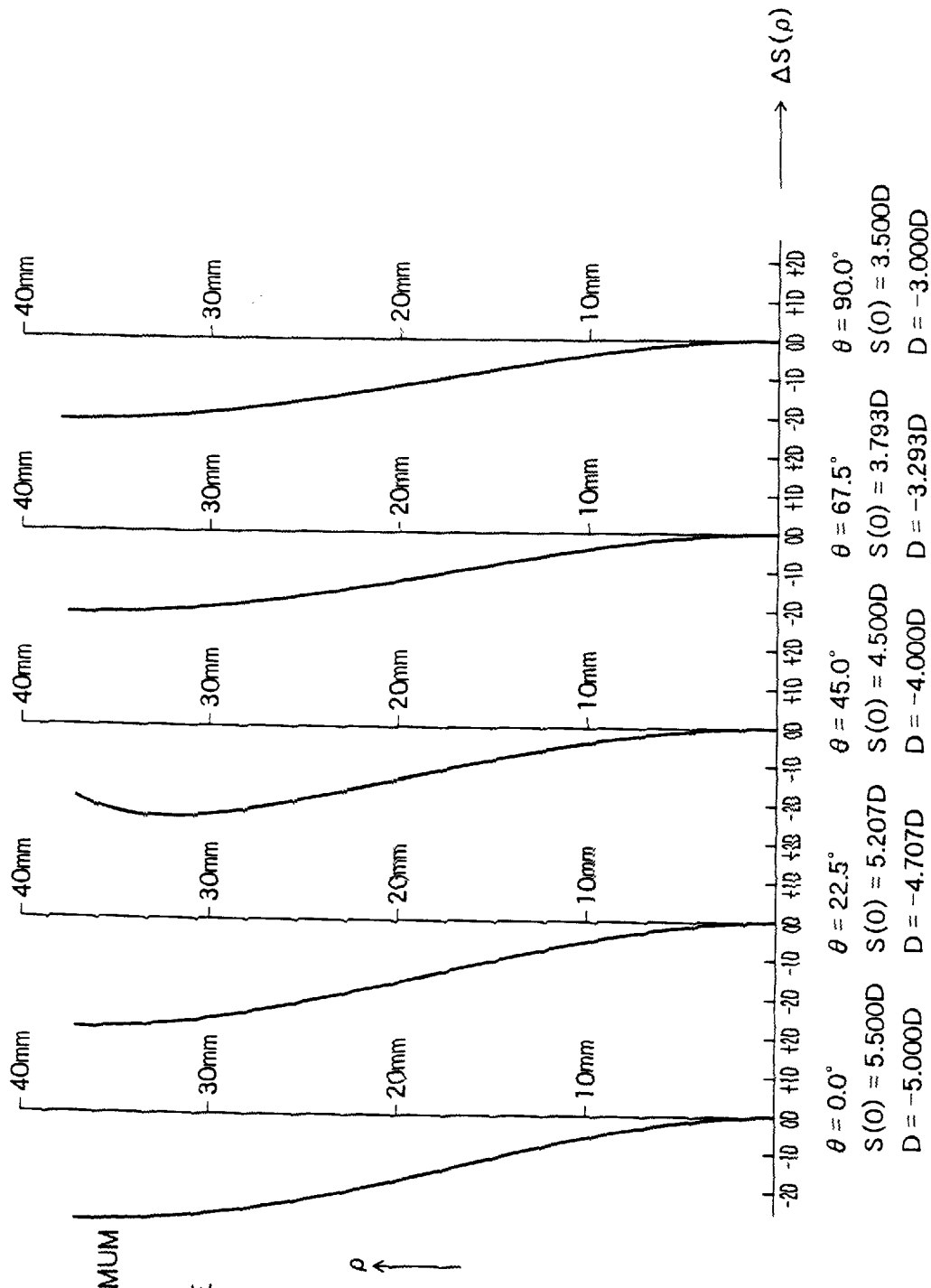
FIG. 9 is a diagram showing the distribution of $\Delta S(\rho)$ in each of the eye positions in an example of minimum residual astigmatism in the case of Example 1-1, in which the axis of abscissa represents $\Delta S(\rho)$ and is graduated at the interval of 1 Diopter (1/m), and the axis of ordinate represents $\rho$ and is graduated at the interval of 10 mm.

FIG. 9 is a diagram showing the distribution of $\Delta S(\rho)$ of the orthogonal curve corresponding to each of five angles ($\theta=0$, 22.5°, 45°, 67.5° and 90°). In this figure, the axis of abscissa represents $\Delta S(\rho)$ and is graduated at the interval of 1 Diopter (1/m), and the axis of ordinate represents $\rho$ and is graduated at the interval of 10 mm. As is seen from this figure, $\Delta S(\rho)$ takes negative values for all values of $\rho$. This corresponds to and is consistent with the foregoing description of the seventh aspherical spectacle-lens of the present invention.

c. Example in Case of Regarding Wearing Stability as Important (Example 1-2)

In the case of an aspherical spectacle-lens that is Example 1-2 according to the present invention, the second surface is represented by a two-dimensional spline expression. Further, the following parameters are used in this Example. Regarding the meaning of the parameters or variables, refer to the foregoing description of the equation (1).

Figure 10:
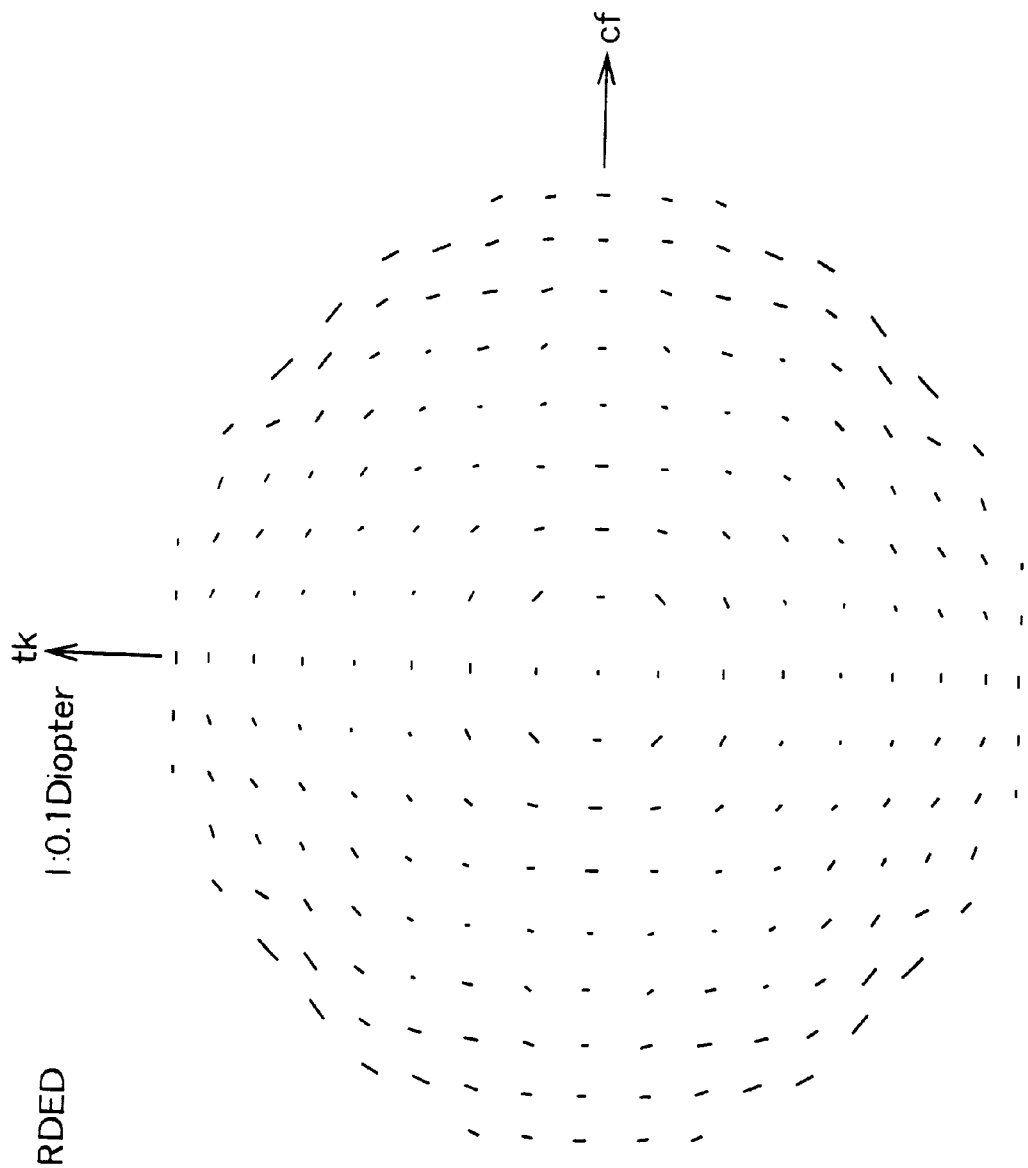
FIG. 10 is a diagram showing the distribution of residual astigmatism in each of the eye positions in an example of regarding what is called the wearing stability (namely, the stability in the optical performance thereof during worn by a wearer) as important in the case of Example 1-2, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the length of a segment, whose middle point is each of the discrete points, is proportional to the value of residual astigmatism, and moreover, the direction of such a segment indicates the direction corresponding to a principal curvature which is a larger one of the signed curvatures of an aberration surface, and the segment drawn at the upper left part of this figure indicates the length of 0.1 Diopters.
Figure 11:
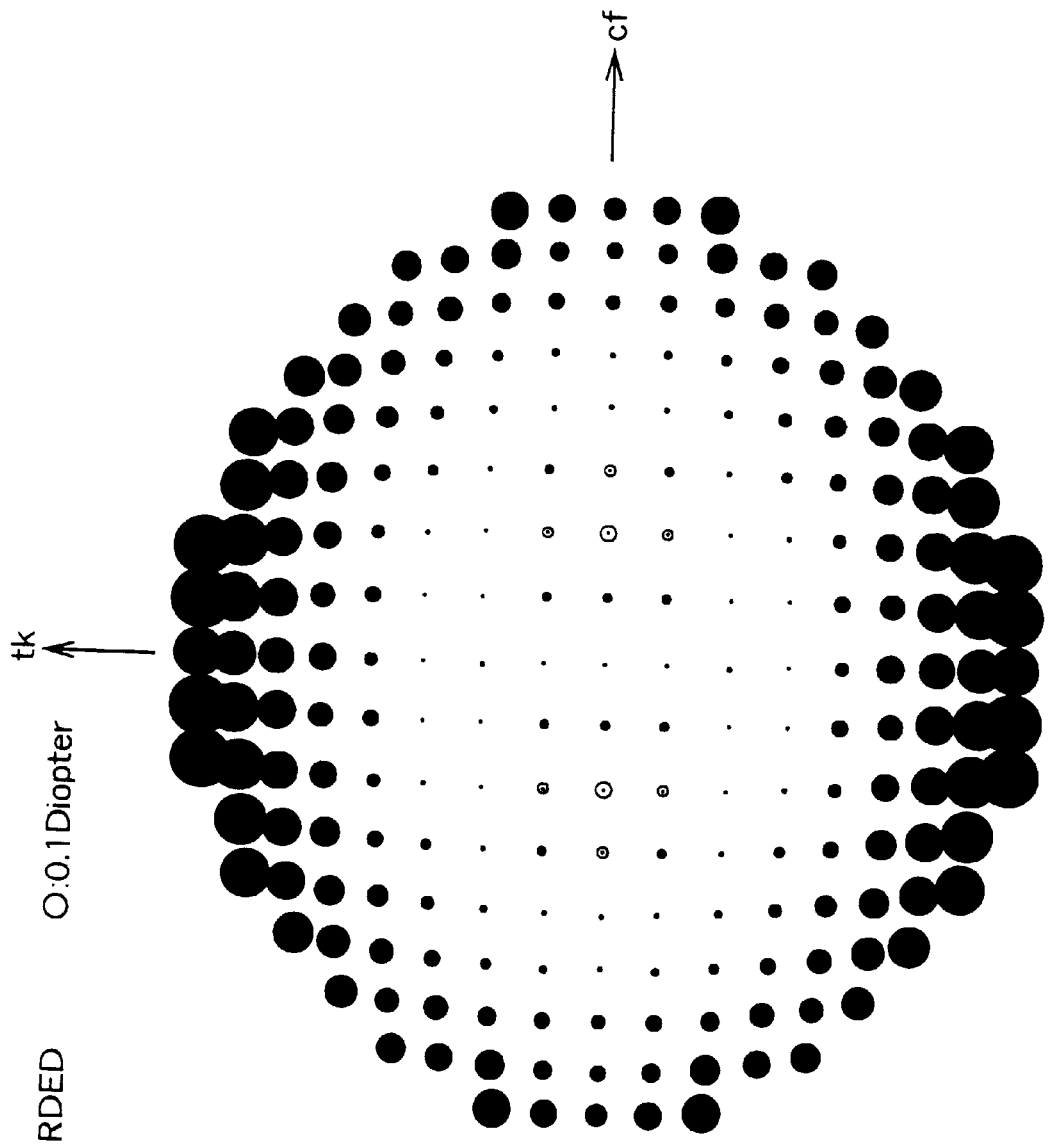
FIG. 11 is a diagram illustrating the distribution of means power errors in each of the eye positions in an example of regarding what is called the wearing stability (namely, the stability in the optical performance thereof during worn by a wearer) as important in the case of Example 1-2, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value an the tk-value at discrete points are those of the outputted light rays corresponding to the directions of incident light rays, which are sampled at intervals of tan 10° and include 0.0, and the degree of unevenness of such values indicates the degree of distortion aberration, and further, the diameter of a circle, whose middle point is each of the discrete points, is proportional to the absolute value of a mean power error, and moreover, white circles indicate negative means power errors and black circles indicate positive power errors, and the white circle drawn at the upper left part of this figure indicates −0.1 Diopters.

$m_y=6$, $n_y=5$, $a=-45.0$, $b=45.0$
$m_z=6$, $n_z=5$, $a=-45.0$, $b=45.0$
$\xi_0=\xi_1=\xi_2=\xi_3=\xi_4=\xi_5=-45.0$
$\xi_6=-14.9859957733$, $\xi_7=-6.52300169973$, $\xi_8=0.0$,
$\xi_9=6.523016973$, $\xi_{10}=14.985957733$,
$\xi_{11}=\xi_{12}=\xi_{13}=\xi_{14}=\xi_{15}=\xi_{16}=45.0$
$'_0='_1='_2='_3='_4='_5=-45.0$
$'_6=-14.9859957733$, $'_7=-6.52300169973$, $'_8=0.0$,
$'_9=6.523016973$, $'_{10}=14.985957733$,
$'_{11}='_{12}='_{13}='_{14}='_{15}='_{16}=45.0$
$c_{0,0}=c_{0,10}=c_{10,0}=c_{10,10}=1.994556949\times10^{01}$
$c_{0,1}=c_{0,9}=c_{10,1}=c_{10,9}=1.71119453369\times10^{01}$
$c_{0,2}=c_{0,8}=c_{10,2}=c_{10,8}=1.860320689\times10^{01}$
$c_{0,3}=c_{0,7}=c_{10,3}=c_{10,7}=8.6773694050\times10^{00}$
$c_{0,4}=c_{0,6}=c_{10,3}=c_{10,7}=1.051302165\times10^{01}$
$c_{0,5}=c_{10,5}=9.197058409\times10^{00}$
$c_{1,0}=c_{1,10}=c_{9,0}=c_{9,10}=1.653149916\times10^{01}$
$c_{1,1}=c_{1,9}=c_{9,1}=c_{9,9}=1.546777021\times10^{01}$
$c_{1,2}=c_{1,8}=c_{9,2}=c_{9,8}=6.803143530\times10^{00}$
$c_{1,3}=c_{1,7}=c_{9,3}=c_{9,7}=8.961897641\times10^{00}$
$c_{1,4}=c_{1,6}=c_{9,3}=c_{9,7}=7.0669113562\times10^{00}$
$c_{1,5}=c_{9,5}=7.2955972711\times10^{00}$
$c_{2,0}=c_{2,10}=c_{8,0}=c_{8,10}=1.4433927393\times10^{01}$
$c_{2,1}=c_{2,9}=c_{8,1}=c_{8,9}=5.7335937731\times10^{00}$
$c_{2,2}=c_{2,8}=c_{8,2}=c_{8,8}=8.150177468\times10^{00}$ $c_{2,3}=c_{2,7}=c_{8,3}=c_{8,7}=5.4055772511\times10^{00}$
$c_{2,4}=c_{2,6}=c_{8,4}=c_{8,6}=5.012854519\times10^{00}$
$c_{2,5}=c_{8,5}=4.549353603\times10^{00}$
$c_{3,0}=c_{3,10}=c_{7,0}=c_{7,10}=5.892825060\times10^{00}$
$c_{3,1}=c_{3,9}=c_{7,1}=c_{7,9}=7.235990755\times10^{00}$
$c_{3,2}=c_{3,8}=c_{7,2}=c_{7,8}=4.386084992\times10^{00}$
$c_{3,3}=c_{3,7}=c_{7,3}=c_{7,7}=3.593073227\times10^{00}$
$c_{3,4}=c_{3,6}=c_{7,4}=c_{7,6}=2.3436882069\times10^{00}$
$c_{3,5}=c_{3,5}=2.184214150\times10^{00}$
$c_{4,0}=c_{4,10}=c_{6,0}=c_{6,10}=6.719499357\times10^{00}$
$c_{4,1}=c_{4,9}=c_{6,1}=c_{6,9}=4.411998886\times10^{00}$
$c_{4,2}=c_{4,8}=c_{6,2}=c_{6,8}=3.432468537\times10^{00}$
$c_{4,3}=c_{4,7}=c_{6,3}=c_{6,7}=1.672490392\times10^{00}$
$c_{4,4}=c_{4,6}=c_{6,4}=c_{6,6}=6.193626608\times10^{-01}$
$c_{4,5}=c_{4,5}=2.3303359421\times10^{-01}$
$c_{5,0}=c_{5,10}=5.487001890\times10^{00}$
$c_{5,1}=c_{5,9}=4.547901070\times10^{00}$
$c_{5,2}=c_{5,8}=2.743423811\times10^{00}$
$c_{5,3}=c_{5,7}=1.344592411\times10^{00}$
$c_{5,4}=c_{5,6}=4.953971243\times10^{-02}$
$c_{5,5}=-2.306568137\times10^{-01}$ FIG. 10 is a diagram showing the distribution of residual astigmatism obtained when a wearer of the spectacle-lens of Example 2-1 directs his eyes along each line of sight. Further, FIG. 11 is a digram showing the distribution of mean power error obtained when a wearer of the spectacle-lens of Example 2-1 directs his eyes along each line of sight. In the case of this example, both of the residual astigmatism and the mean power error can be corrected in a wide range and can be reduced to small values, respectively. If an angle between the line of sight in an arbitrary third eye-position and the line of sight in the first eye-position is α, each of the residual astigmatism and the mean power errors is not more than 0.01 Diopters (1/m) at least in a range where α<35°.

Figure 12:
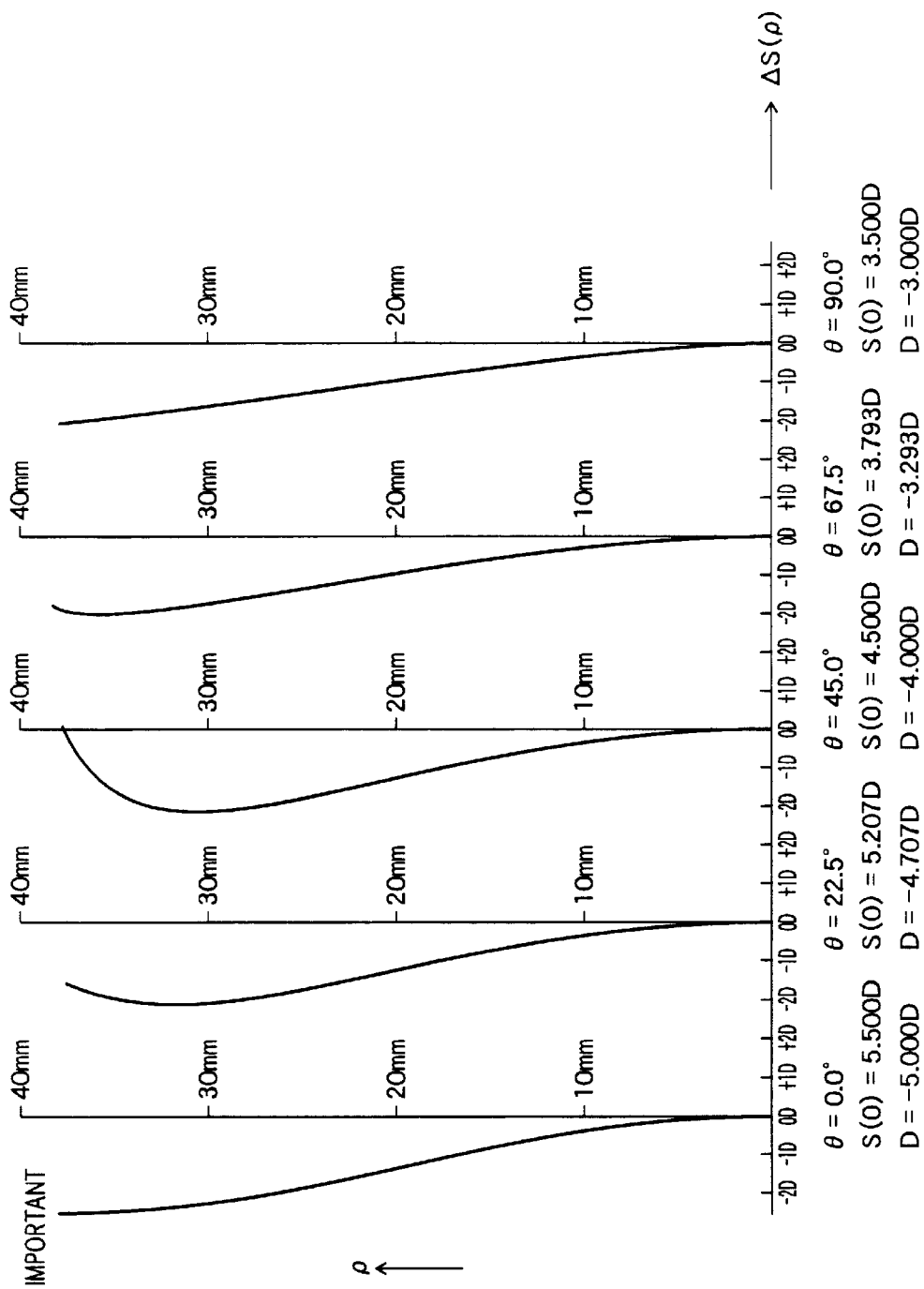
FIG. 12 is a diagram showing the distribution of $\Delta S(\rho)$ in each of the eye positions in an example of regarding what is called the wearing stability (namely, the stability in the optical performance thereof during worn by a wearer) as important in the case of Example 1-2, in which the axis of abscissa represents $\Delta S(\rho)$ and is graduated at the interval of 1 Diopter (1/m), and the axis of ordinate represents $\rho$ and is graduated at the interval of 10 mm.

FIG. 12 is a diagram showing the distribution of ΔS(ρ) of the orthogonal curve corresponding to each of five angles (θ=0, 22.5°, 45°, 67.5° and 90°). In this figure, the axis of abscissa represents ΔS(ρ) and is graduated at the interval of 1 Diopter (1/m), and the axis of ordinate represents ρ and is graduated at the interval of 10 mm. As is seen from this figure, ΔS(ρ) is small in the vicinity of the optical axis and takes negative values in the peripheral portion.

Figure 13:
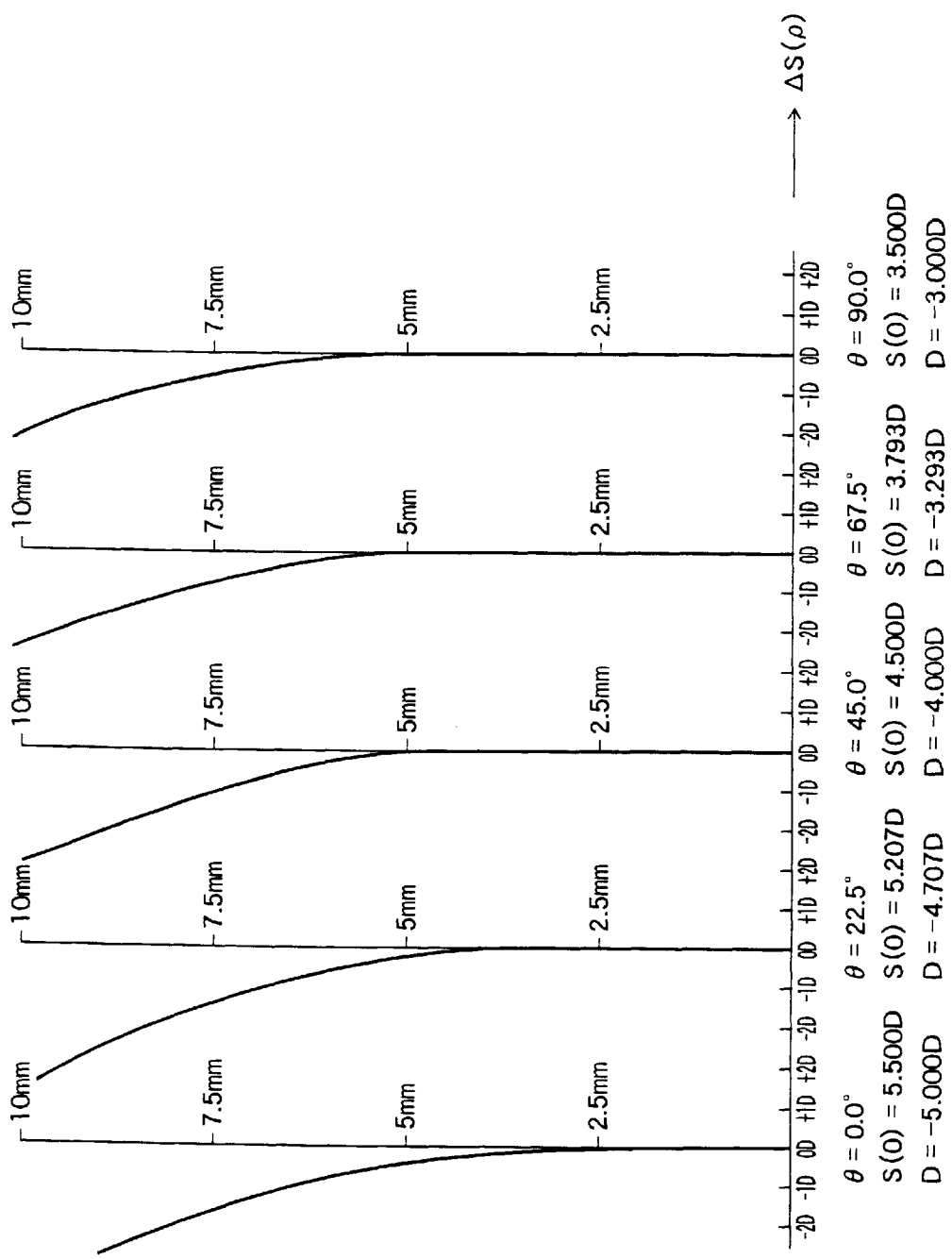
FIG. 13 is an enlarged diagram showing the central portion of the distribution of $\Delta S(\rho)$ in each of the eye positions in an example of regarding what is called the wearing stability as important in the case of Example 1-2, in which the axis of abscissa represents $\Delta S(\rho)$ and is graduated at the interval of 1 Diopter (1/m), and the axis of ordinate represents $\rho$ and is graduated at the interval of 2.5 mm.

FIG. 13 is an enlarged diagram showing the central portion (0≦ρ≦10.0 mm) of the distribution of ΔS(ρ) of the orthogonal curve corresponding to each of five angles (θ=0, 22.5°, 45°, 67.5° and 90°). Further, the axis of abscissa is graduated at the interval of 0.1 Diopter (1/m), and the axis of ordinate is graduated at the interval of 2.5 mm. In the case of each of the five angles, in a range where 0.0<ρ<4, ΔS(ρ) satisfies the following inequality; −0.05≦ΔS(ρ)≦0.05. Further, in a range where 0.0≦ρ≦10.0 mm, ΔS(ρ) takes a positive value at least once. Furthermore, in a range where ρ>10.0 mm, ΔS(ρ) takes negative values. Namely, this corresponds to an is consistent with the descriptions of the eighth and tenth aspherical spectacle-lens of the present invention.

The shapes of the aforementioned three examples are summarized in the following TABLE 2:

TABLE 2

|  | Center Thickness | Maximum Edge Thickness | Minimum Edge Thickness |
| --- | --- | --- | --- |
| a. Conventional Example | 1.3 mm | 8.675369 mm | 5.597690 mm |
| b. Example | | | |

TABLE 2-continued

|  | Center Thickness | Maximum Edge Thickness | Minimum Edge Thickness |
| --- | --- | --- | --- |
| in Case of Minimum Residual Astigmatism | 1.3 mm | 7.243439 mm | 4.675252 mm |
| c. Example in Case of Regarding Wearing Stability as Important | 1.3 mm | 7.467039 mm | 4.855613 mm |

As is obvious from the aforementioned table, the Embodiment 1 (namely, the Examples 1-1 and 1-2) has noticeable effects of reducing the thickness and weight of the lens.

EMBODIMENTS 2

This embodiment is an example of making an astigmatic lens based on the basic design data listed in the following TABLE 3.

TABLE 3

| Prescribed Value | S + 3.00, C + 2.00 |
| --- | --- |
| Outside Diameter | 70 mm |
| Minimum Edge Thickness | 0.8 mm |
| Center Thickness | 6.992361 mm (incidentally, this value slightly changes in the case of an aspherical surface) |
| Refractive Index | 1.501 |
| First Curvature | $1.070379579\times10^{-2}$ mm$^{-1}$ (S = 5.36260D) |
| Second Curvature | $C_y = 9.980039920\times10^{-4}$ mm$^{-1}$ ($S_y$ = 0.5D) $C_y = 4.990019960\times10^{-3}$ mm$^{-1}$ ($S_y$ = 2.5D) (incidentally, these values slightly change according to center thickness) | a. Curved Surface by Conventional Technique (Comparative Example 2-1)

According to the conventional technique, the second surface is (a kind of) a toric surface. Namely, this curved surface is obtained by rotating a circular curve in the x-z plane, which is given by:

$$x = f(z) = \frac{1}{C_z}\left(1 - \sqrt{1 - C_z^2 z^2}\right)$$

around a straight line which serves as an axis of rotation and is given by:

$x=1/C_y$ and y=0.

Figure 14:
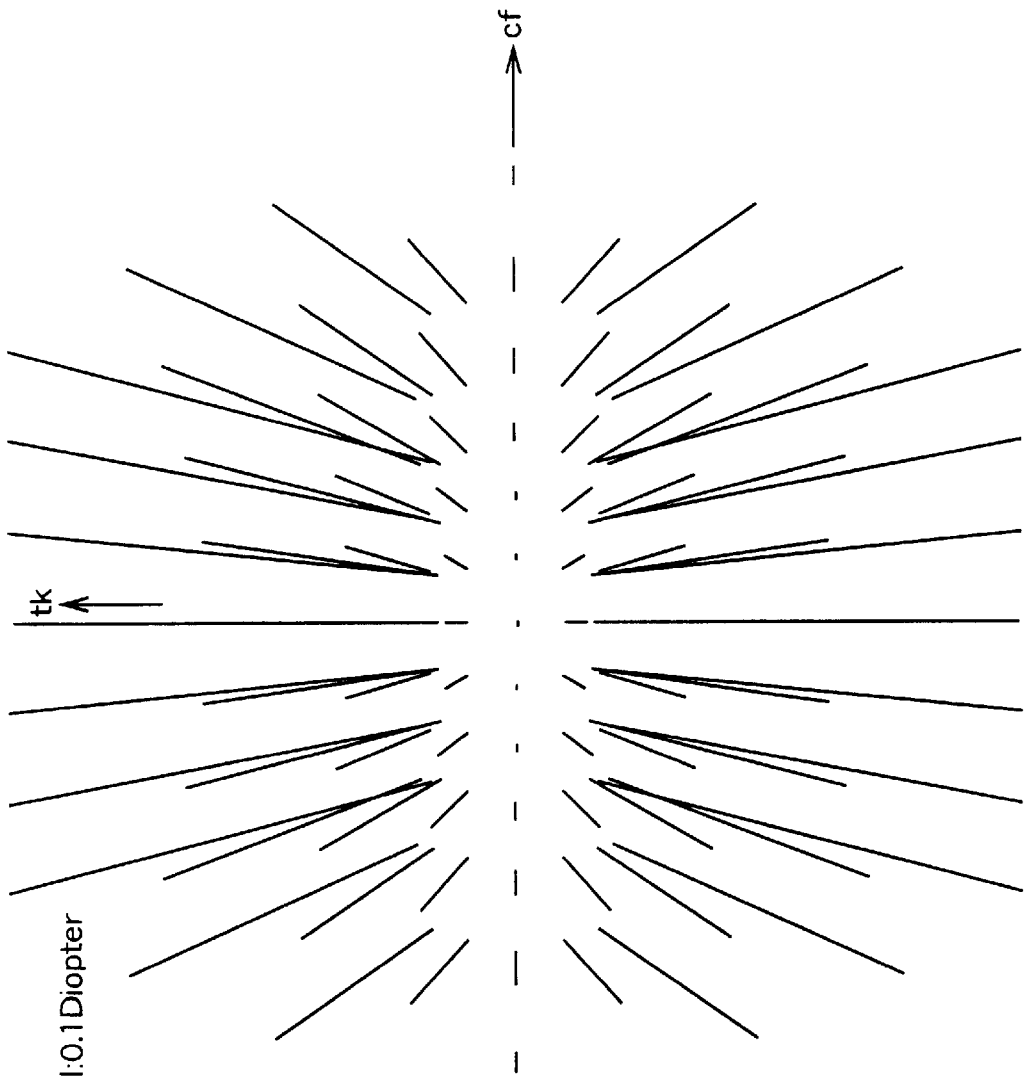
FIG. 14 is a diagram showing the distribution of residual astigmatism in Comparative Example 2, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the length of a segment, whose middle point is each of the discrete points, is proportional to the value of residual astigmatism, and moreover, the direction of such a segment indicates the direction corresponding to a principal curvature which is a larger one of the signed curvatures of an aberration surface, and the segment drawn at the upper left part of this figure indicates the length of 0.1 Diopters.
Figure 15:
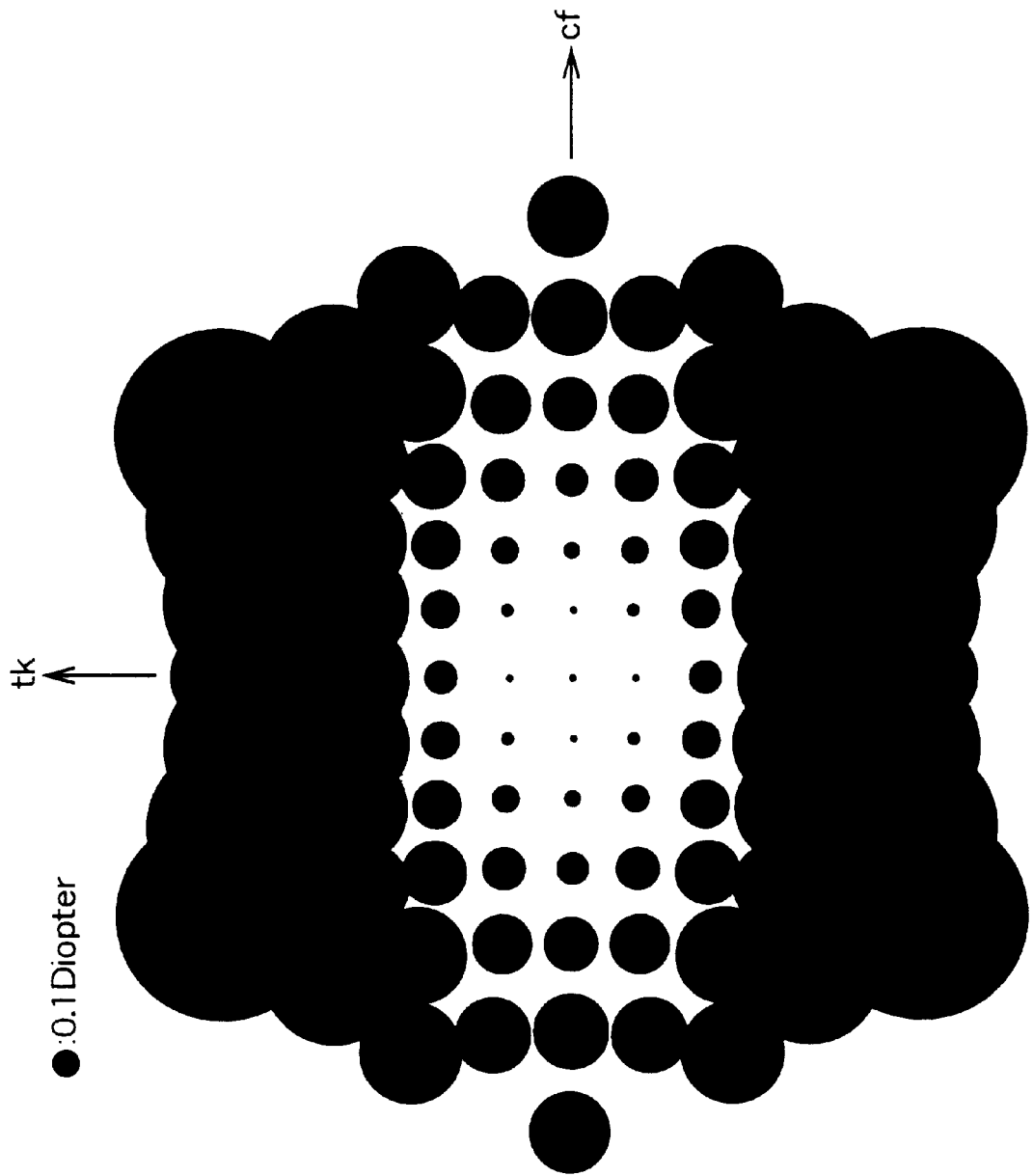
FIG. 15 is a diagram illustrating the distribution of mean power errors in each of the eye positions in Comparative Example 2, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the diameter of a circle, whose middle point is each of the discrete points, is proportional to the absolute value of a mean power error, and moreover, white circles indicate negative mean power errors and black circles indicate positive power errors, and the white circle drawn at the upper left part of this figure indicates −0.1 Diopters.

In this case, $C_y<C_z$, so that this curved surface is a "tire surface". Further, as above described, this curved surface is a kind of a toric surface. Thus, there is no parameter other than basic design data. FIG. 14 is a diagram illustrating the residual astigmatism in the case of directing a wearer's eye along each line of sight. FIG. 15 is a diagram showing the mean power error in the case of directing the wearer's eye along each lien of sight. As is seen from these figures, the designed toric surface having a slight curve in this manner cannot possibly be employed because high aberration is caused in such a toric surface portion. The following two Examples are obtained by forming the second surface, which is an astigmatic surface, as an aspherical surface in order to correct the aberration.

b. Example in Case of Minimum Residual Astigmatism (Example 2-1)

In the case of an aspherical spectacle-lens that is Example 2-1 according to the present invention, the second surface is represented by a two-dimensional spline expression. Further, the following parameters are used in this Example. Regarding the meaning of the parameters or variables, refer to the foregoing description of the equation (1).

Moreover, the center thickness t=6.093690 mm. The second surface curvatures are as follows:

$$C_y = \frac{\partial^2 x}{\partial y^2}(0.0, 0.0) = 9.6197717658 \times 10^{-4} \text{mm}^{-1} (S_y = 0.48195D)$$

$$C_z = \frac{\partial^2 x}{\partial z^2}(0.0, 0.0) = 9.6197717658 \times 10^{-4} \text{mm}^{-1} (S_z = 0.48195D)$$

Figure 16:
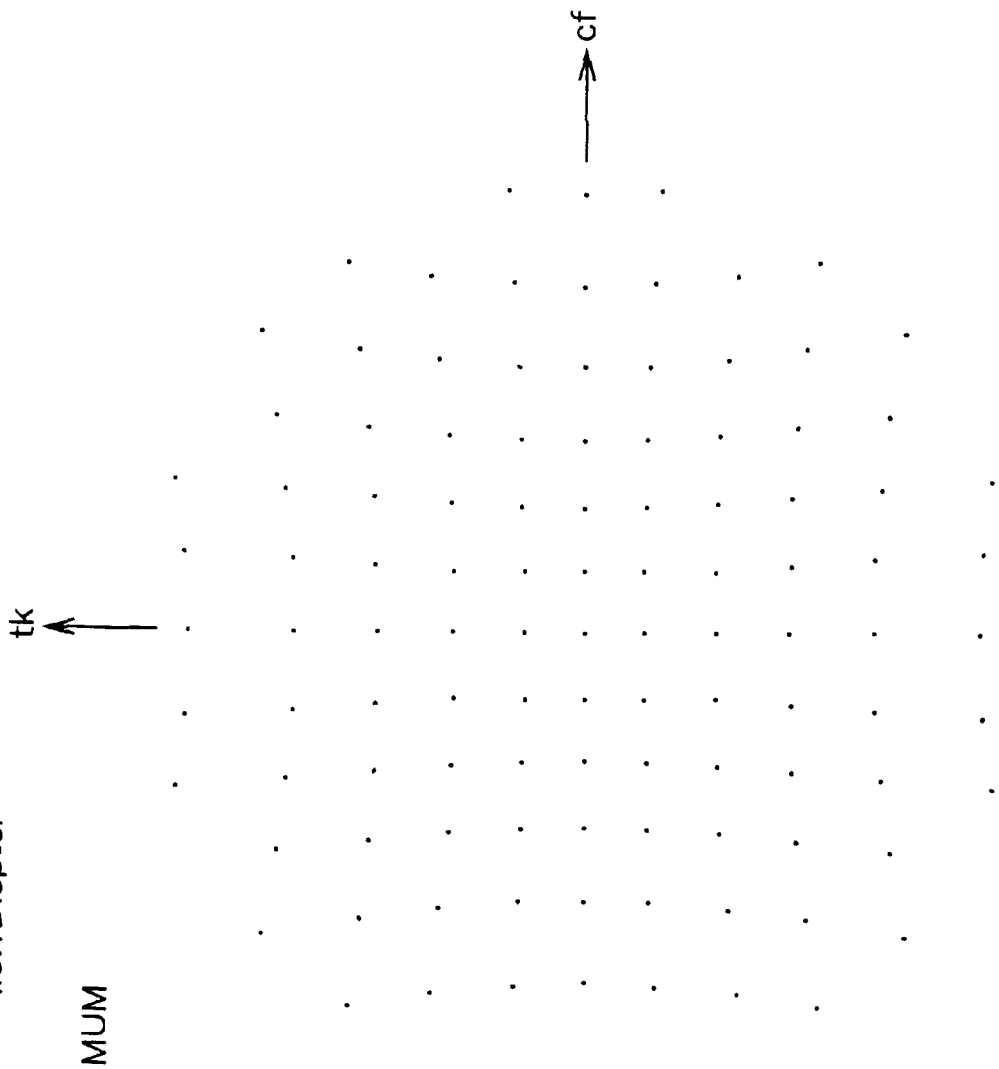
FIG. 16 is a diagram showing the distribution of residual astigmatism in each of the eye positions in an example of minimum residual astigmatism in the case of Example 2-1, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the length of a segment, whose middle point is each of the discrete points, is proportional to the value of residual astigmatism, and moreover, the direction of such a segment indicates the direction corresponding to a principal curvature which is a larger one of the signed curvatures of an aberration surface, and the segment drawn at the upper left part of this figure indicates the length of 0.1 Diopters.
Figure 17:
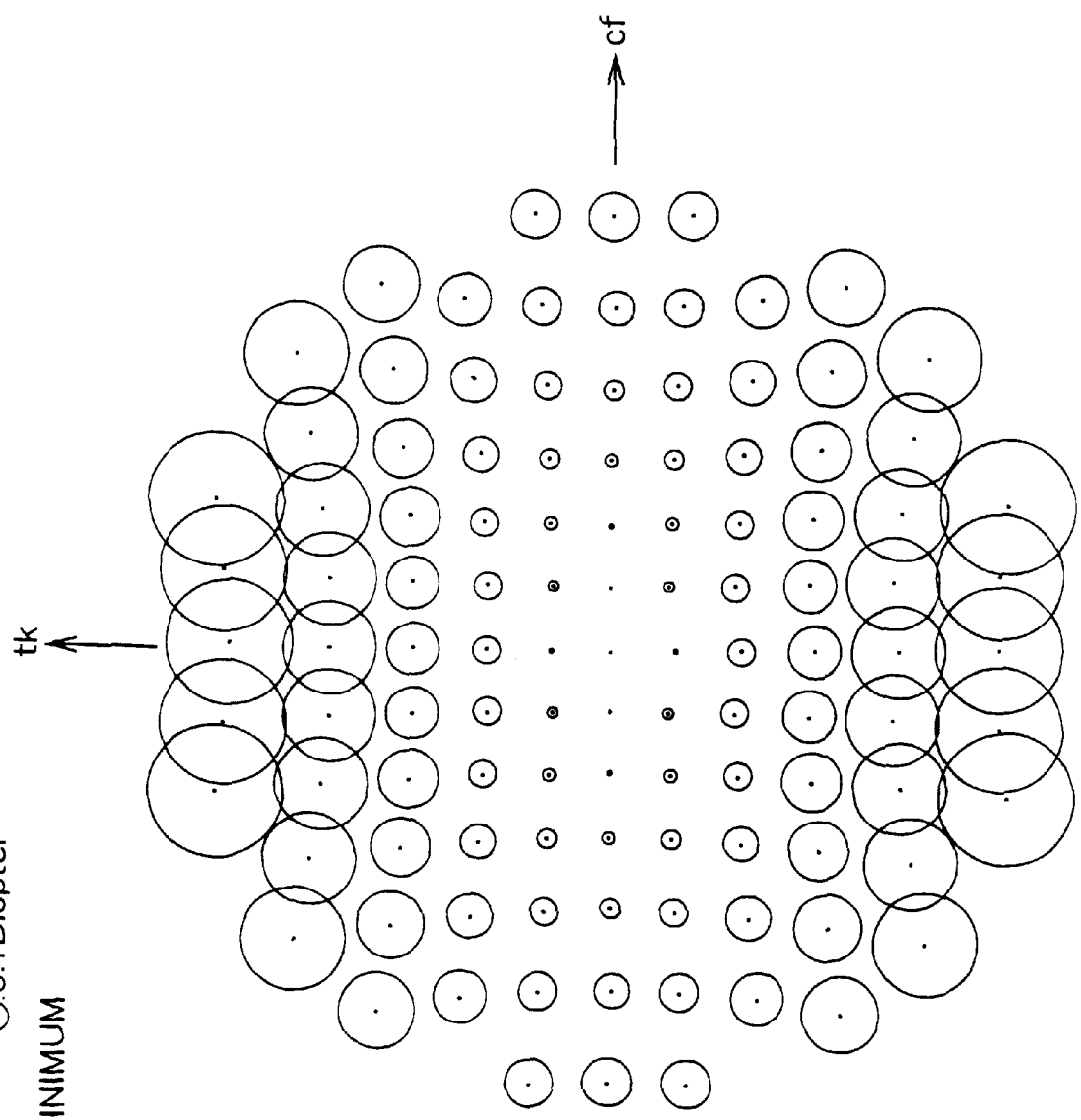
FIG. 17 is a diagram showing the distribution of mean power errors in each of the eye positions in an example of minimum residual astigmatism in the case of Example 2-1, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the direction of incident light rays, which are sampled at intervals of tan 10° and include 0.0, and the degree of unevenness of such values indicates the degree of distortion aberration, and further, the diameter of a circle, whose middle point is each of the discrete points, is proportional to the absolute value of a mean power error, and moreover, white circles indicate negative mean power errors and black circles indicate positive power errors, and the white circle drawn at the upper left part of this figure indicates −0.1 Diopters.

$m_y=6$, $n_y=5$, $a=-45.0$, $b=45.0$
$m_z=6$, $n_z=5$, $a=-45.0$, $b=45.0$
$\xi_0=\xi_1=\xi_2=\xi_3=\xi_4=\xi_5=-45.0$
$\xi_6=-14.985957733$, $\xi_7=-6.5230016973$, $\xi_8=0.0$,
$\xi_9=6.523016973$, $\xi_{10}=14.985957733$,
$\xi_{11}=\xi_{12}=\xi_{13}=\xi_{14}=\xi_{15}=\xi_{16}=45.0$
$\text{'}_0=\text{'}_1=\text{'}_2=\text{'}_3=\text{'}_4=\text{'}_5=-45.0$
$\text{'}_6=-14.985957733$, $\text{'}_7=-6.5230016973$, $\text{'}_8=0.0$,
$\text{'}_9=6.523016973$, $\text{'}_{10}=14.985957733$,
$\text{'}_{11}=\text{'}_{12}=\text{'}_{13}=\text{'}_{14}=\text{'}_{15}=\text{'}_{16}=45.0$
$c_{0,0}=c_{0,10}=c_{10,0}=c_{10,10}=5.7096239559\times10^{00}$
$c_{0,1}=c_{0,9}=c_{10,1}=c_{10,9}=6.922913896\times10^{00}$
$c_{0,2}=c_{0,8}=c_{10,2}=c_{10,8}=5.685613105\times10^{01}$
$c_{0,3}=c_{0,7}=c_{10,3}=c_{10,7}=4.104517409\times10^{00}$
$c_{0,4}=c_{0,6}=c_{10,3}=c_{10,7}=3.066234599\times10^{00}$
$c_{0,5}=c_{10,5}=2.782391329\times10^{00}$
$c_{1,0}=c_{1,10}=c_{9,0}=c_{9,10}=7.720589590\times10^{00}$
$c_{1,1}=c_{1,9}=c_{9,1}=c_{9,9}=6.5792333163\times10^{00}$
$c_{1,2}=c_{1,8}=c_{9,2}=c_{9,8}=4.715185045\times10^{00}$
$c_{1,3}=c_{1,7}=c_{9,3}=c_{9,7}=3.178286369\times10^{00}$
$c_{1,4}=c_{1,6}=c_{9,3}=c_{9,7}=2.104881868\times10^{00}$
$c_{1,5}=c_{9,5}=1.8277723099\times10^{00}$
$c_{2,0}=c_{2,10}=c_{8,0}=c_{8,10}=7.191130346\times10^{00}$
$c_{2,1}=c_{2,9}=c_{8,1}=c_{8,9}=5.460764236\times10^{00}$
$c_{2,2}=c_{2,8}=c_{8,2}=c_{8,8}=3.721573329\times10^{00}$
$c_{2,3}=c_{2,7}=c_{8,3}=c_{8,7}=2.181865715\times10^{00}$
$c_{2,4}=c_{2,6}=c_{8,4}=c_{8,6}=1.148960478\times10^{00}$
$c_{2,5}=c_{8,5}=8.753300818\times10^{-01}$
$c_{3,0}=c_{3,10}=c_{7,0}=c_{7,10}=6.273295341\times10^{00}$
$c_{3,1}=c_{3,9}=c_{7,1}=c_{7,9}=4.705169613\times10^{00}$
$c_{3,2}=c_{3,8}=c_{7,2}=c_{7,8}=2.951400168\times10^{01}$
$c_{3,3}=c_{3,7}=c_{7,3}=c_{7,7}=1.472064277\times10^{01}$
$c_{3,4}=c_{3,6}=c_{7,4}=c_{7,6}=4.438430227\times10^{-01}$
$c_{3,5}=c_{3,5}=1.762633153\times10^{-01}$
$c_{4,0}=c_{4,10}=c_{6,0}=c_{6,10}=5.812717510\times10^{00}$
$c_{4,1}=c_{4,9}=c_{6,1}=c_{6,9}=4.198242094\times10^{00}$
$c_{4,2}=c_{4,8}=c_{6,2}=c_{6,8}=2.512088483\times10^{00}$
$c_{4,3}=c_{4,7}=c_{6,3}=c_{6,7}=1.088215649\times10^{00}$
$c_{4,4}=c_{4,6}=c_{6,4}=c_{6,6}=1.851123317\times10^{-01}$
$c_{4,5}=c_{4,5}=-4.763544683\times10^{-02}$
$c_{5,0}=c_{5,10}=5.662689900\times10^{00}$
$c_{5,1}=c_{5,9}=4.081509518\times10^{00}$
$c_{5,2}=c_{5,8}=2.399859107\times10^{00}$
$c_{5,3}=c_{5,7}=9.981969843\times10^{00}$
$c_{5,4}=c_{5,6}=1.397196531\times10^{-02}$
$c_{5,5}=--7.350662150\times10^{-01}$ FIG. 16 is a diagram showing the distribution of residual astigmatism obtained when a wearer of the spectacle-lens of Example 2-1 directs his eyes along each line of sight. Further, FIG. 17 is a diagram showing the distribution of mean power error obtained when a wearer of the spectacle-lens of Example 2-1 directs his eyes along each line of sight. In the case of this example, the residual astigmatism is corrected in such a manner as not to be more than 0.01 Diopters (1/m) for all of lines of sight that pass through the lens (range). In FIG. 16, segments indicating the magnitude of the residual astigmatism are represented by points at all discrete points. However, in the peripheral portion, there still remain some large mean value errors. It is clear that, in the case of "Example 2-1" the condition of aberration is extremely improved in comparison with the toric lens of "Comparative Example 2".

Figure 18:
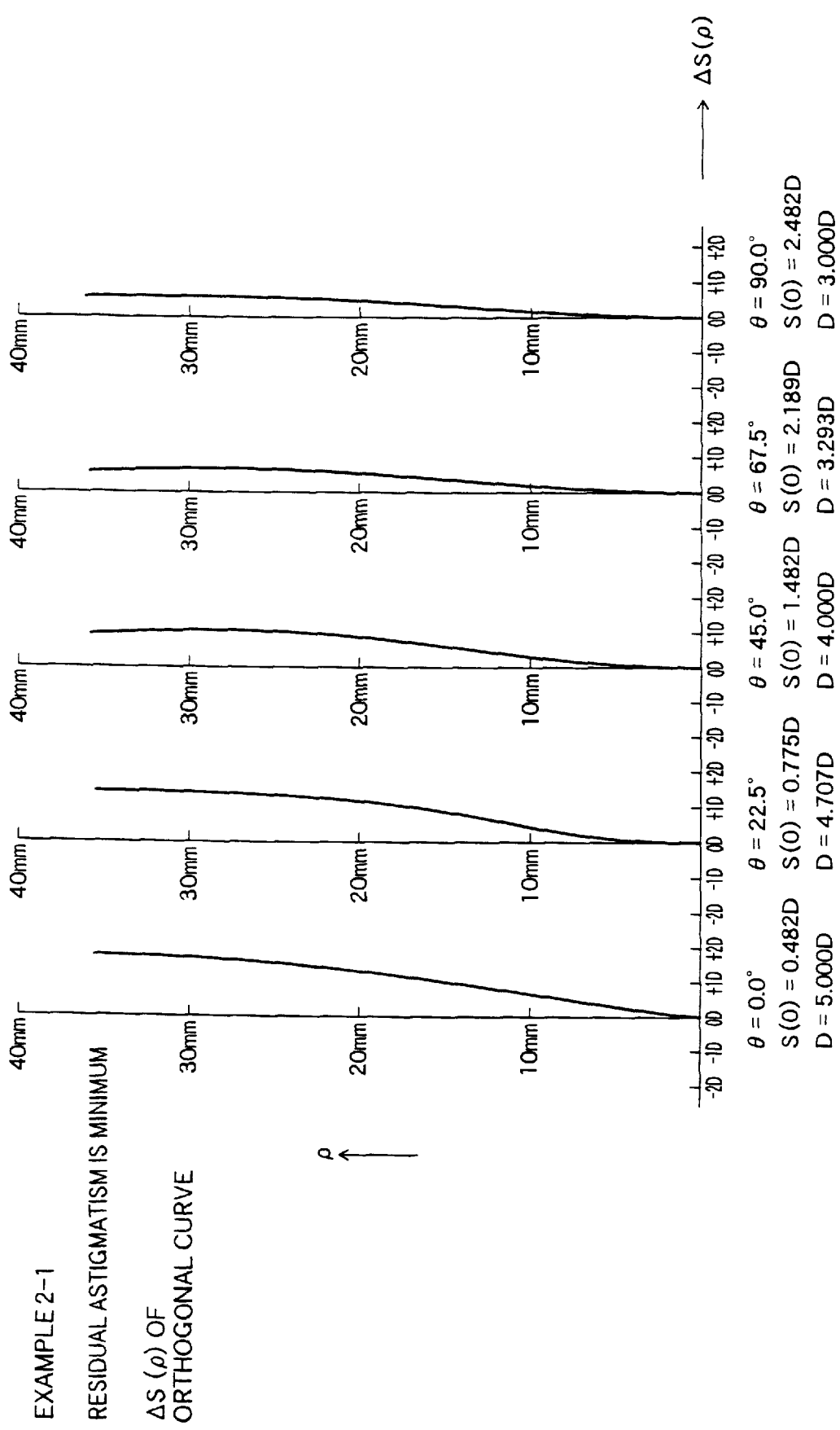
FIG. 18 is a diagram showing the distribution of $\Delta S(\rho)$ in each of the eye positions in an example of minimum residual astigmatism in the case of Example 2-1, in which the axis of abscissa represents $\Delta S(\rho)$ and is graduated at the interval of 1 Diopter (1/m), and the axis of ordinate represents $\rho$ and is graduated at the interval of 10 mm.

FIG. 18 is a diagram showing the distribution of $\Delta S(\rho)$ of the orthogonal curve corresponding to each of five angles ($\theta=0$, $22.5°$, $45°$, $67.5°$ and $90°$). In this figure, the axis of abscissa represents $\Delta S(\rho)$ and is graduated at the interval of 1 Diopter (1/m), and the axis of ordinate represents $\rho$ and is graduated at the interval of 10 mm. As is seen from this figure, $\Delta S(\rho)$ takes positive values for all values of $\rho$. This corresponds to and is consistent with the foregoing description of the seventh aspherical spectacle-lens of the present invention.

Example in Case of Regarding Wearing Stability as Important (Example 2-2)

In the case of an aspherical spectacle-lens that is Example 2-2 according to the present invention, the second surface is represented by a tow-dimensional spline expression. Further, the following parameters are used in this Example. Regarding the meaning of the parameters or variables, refer to the foregoing description of the equation (1).

Moreover, the center thickness 1=6.224427 mm. The second surface curvatures are as follows:

$$C_y = \frac{\partial^2 x}{\partial y^2}(0.0, 0.0) = 9.672003860 \times 10^{-4} \text{mm}^{-1} (S_y = 0.48457D)$$

$$C_z = \frac{\partial^2 x}{\partial z^2}(0.0, 0.0) = 4.959214864 \times 10^{-4} \text{mm}^{-1} (S_z = 2.48457D)$$

Figure 19:
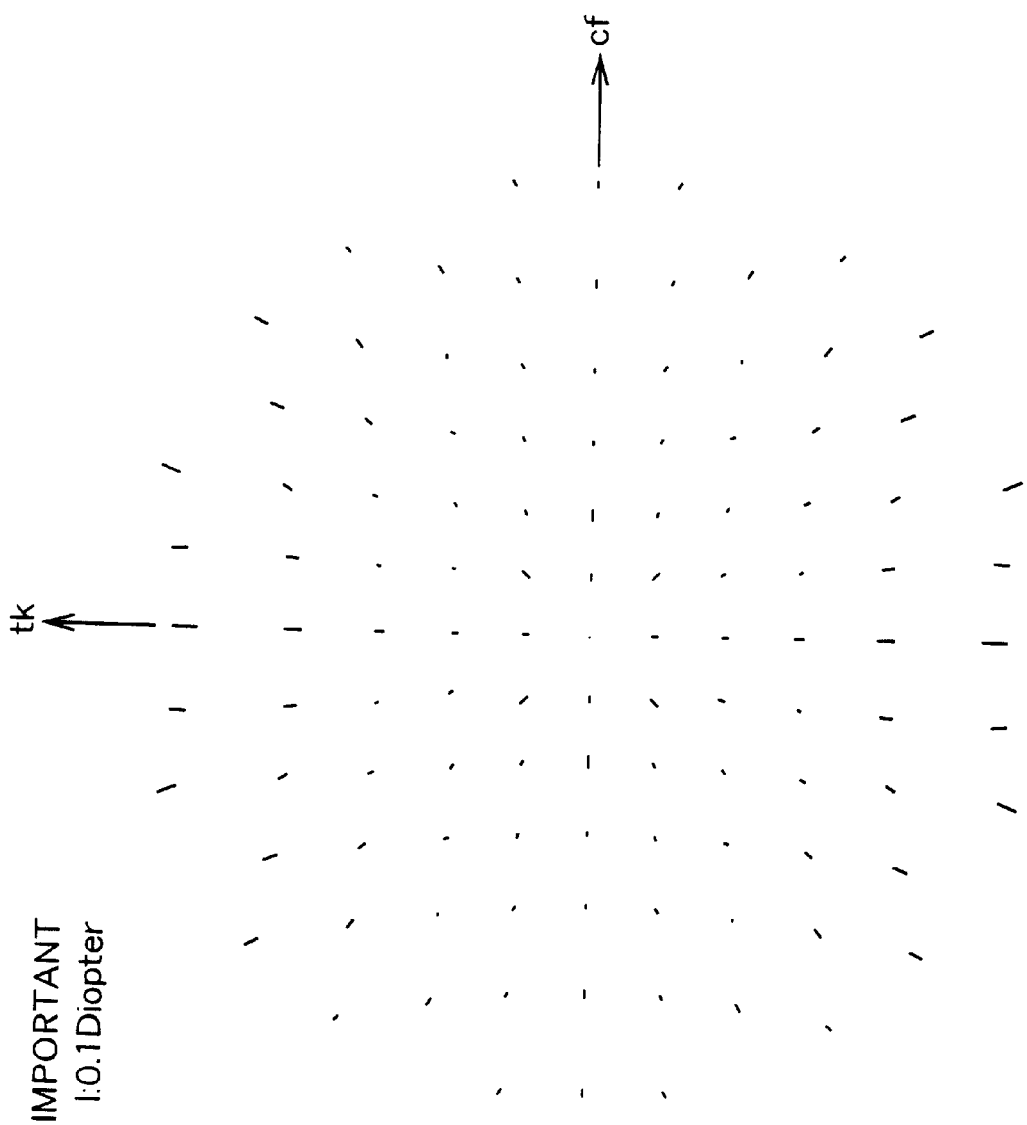
FIG. 19 is a diagram showing the distribution of residual astigmatism in each of the eye positions in an example of regarding what is called the wearing stability (namely, the stability in the optical performance thereof during worn by a wearer) as important in the case of Example 2-2, in which the axis of abscissa represents the cf-value (namely, the value of a tangent of an angle between the projection of the light ray onto the x-z plane and the x-axis) of light rays or beams outputted from the lines and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the length of a segment, whose middle point is each of the discrete points, is proportional to the value of residual astigmatism, and moreover, the direction of such a segment indicates the direction corresponding to a principal curvature which is a larger one of the signed curvatures of an aberration surface, and the segment drawn at the upper left part of this figure indicates the length of 0.1 Diopters.
Figure 20:
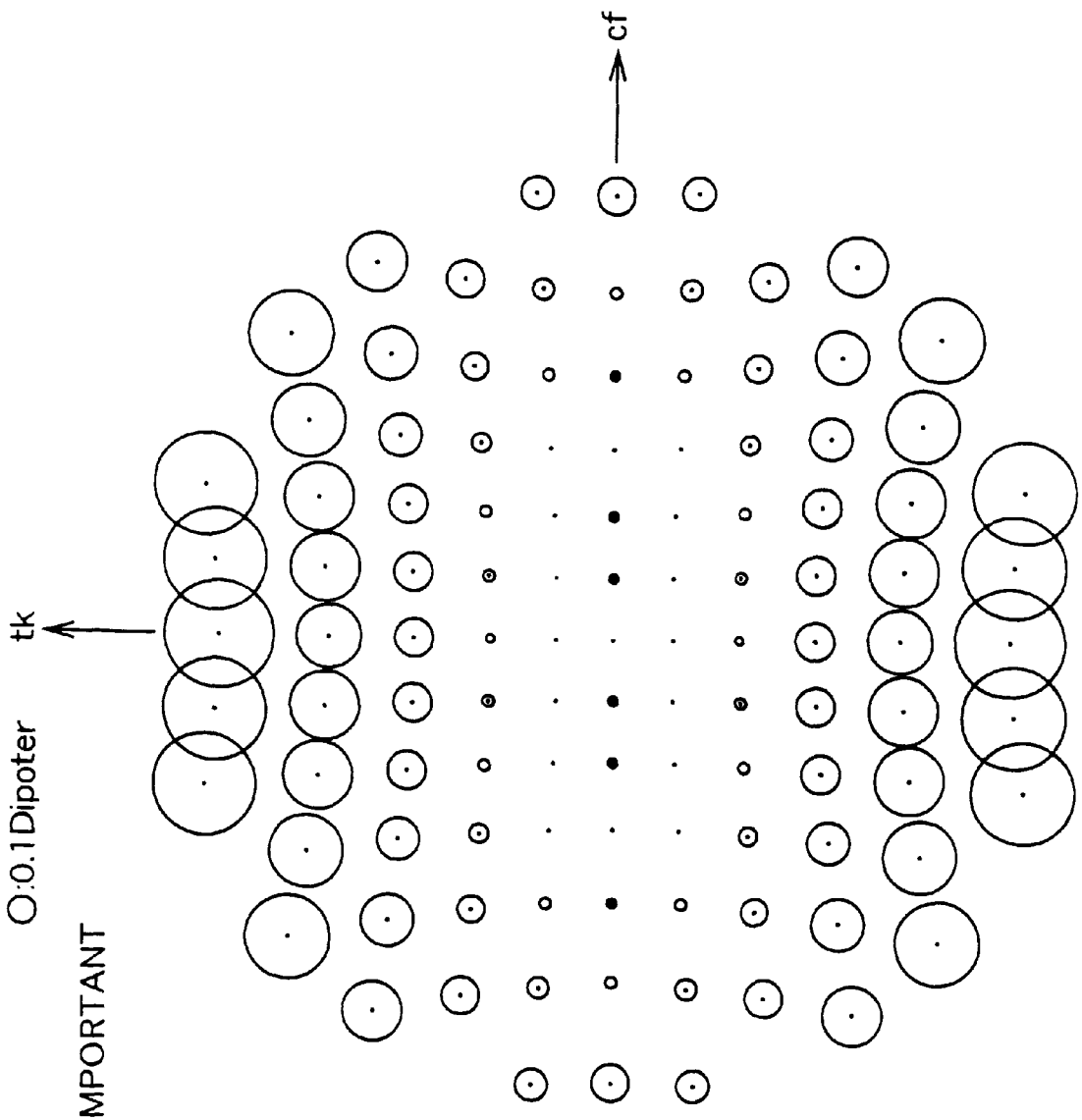
FIG. 20 is a diagram illustrating the distribution of mean power errors in each of the eye positions in an example of regarding what is called the wearing stability as important in the case of Example 2-2, in which the axis of abscissa represents the cf-value (namely, the value of a tangent of an angle between the projection of the light ray onto the x-z plane and the x-axis) of light rays or beams outputted from the lens and the axis of ordinate represents the tk-value (namely, the value of a tangent of an angle between the projection of the light ray onto the x-y plane and the x-axis) of the light ray or beam outputted from the lens (incidentally, in this figure, the cf-value and the tk-value at discrete points are those of the outputted light rays corresponding to the directions of incident light rays, which are sampled at intervals of tan 10° and include 0.0, and the degree of unevenness of such values indicates the degree of distortion aberration, and further, the diameter of a circle, whose middle point is each of the discrete points, is proportional to the absolute value of a mean power error, and moreover, white circles indicate negative means power errors and black circles indicate positive power errors, and the white circle drawn at the upper left part of this figure indicates −0.1 Diopters.

$m_y=6$, $n_y=5$, $a=-45.0$, $b=45.0$
$m_z=6$, $n_z=5$, $a=-45.0$, $b=45.0$
$\xi_0=\xi_1=\xi_2=\xi_3=\xi_4=\xi_5=-45.0$
$\xi_6=-14.9859957733$, $\xi_7=-6.52300169973$, $\xi_8=0.0$,
$\xi_9=6.523016973$, $\xi_{10}=14.985957733$,
$\xi_{11}=\xi_{12}=\xi_{13}=\xi_{14}=\xi_{15}=\xi_{16}=45.0$
$c_{0,0}=c_{0,10}=c_{10,0}=c_{10,10}=6.113483258\times10^{00}$
$c_{0,1}=c_{0,9}=c_{10,1}=c_{10,9}=3.438885539\times10^{00}$
$c_{0,2}=c_{0,8}=c_{10,2}=c_{10,8}=5.1445372513\times10^{00}$
$c_{0,3}=c_{0,7}=c_{10,3}=c_{10,7}=4.166548380\times10^{00}$
$c_{0,4}=c_{0,6}=c_{10,3}=c_{10,7}=2.635174596\times10^{00}$
$c_{0,5}=c_{10,5}=2.678791899\times10^{00}$
$c_{1,0}=c_{1,10}=c_{9,0}=c_{9,10}=3.565299027\times10^{00}$
$c_{1,1}=c_{1,9}=c_{9,1}=c_{9,9}=6.089367183\times10^{01}$
$c_{1,2}=c_{1,8}=c_{9,2}=c_{9,8}=4.868411178\times10^{00}$
$c_{1,3}=c_{1,7}=c_{9,3}=c_{9,7}=2.7707465908\times10^{00}$
$c_{1,4}=c_{1,6}=c_{9,3}=c_{9,7}=2.087288071\times10^{00}$
$c_{1,5}=c_{9,5}=1.583923164\times10^{00}$
$c_{2,0}=c_{2,10}=c_{8,0}=c_{8,10}=6.344699034196\times10^{00}$
$c_{2,1}=c_{2,9}=c_{8,1}=c_{8,9}=5.694051442\times10^{00}$
$c_{2,2}=c_{2,8}=c_{8,2}=c_{8,8}=3.200637732\times10^{00}$
$c_{2,3}=c_{2,7}=c_{8,3}=c_{8,7}=2.227038262\times10^{00}$
$c_{2,4}=c_{2,6}=c_{8,4}=c_{8,6}=9.438151059\times10^{-01}$
$c_{2,5}=c_{8,5}=8.495055094\times10^{-01}$
$c_{3,0}=c_{3,10}=c_{7,0}=c_{7,10}=6.55557264406\times10^{00}$
$c_{3,1}=c_{3,9}=c_{7,1}=c_{7,9}=4.1806113606\times10^{00}$
$c_{3,2}=c_{3,8}=c_{7,2}=c_{7,8}=3.002104440\times10^{00}$
$c_{3,3}=c_{3,7}=c_{7,3}=c_{7,7}=1.276770802\times10^{00}$ $c_{3,4}=c_{3,6}=c_{7,4}=c_{7,6}=4.658500089\times10^{-01}$
$c_{3,5}=c_{3,5}=9.977890126\times10^{-02}$
$c_{4,0}=c_{4,10}=c_{6,0}=c_{6,10}=5.258338873\times10^{00}$
$c_{4,1}=c_{4,9}=c_{6,1}=c_{6,9}=4.204011893\times10^{00}$
$c_{4,2}=c_{4,8}=c_{6,2}=c_{6,8}=2.298446957\times10^{00}$
$c_{4,3}=c_{4,7}=c_{6,3}=c_{6,7}=1.107851016\times10^{00}$
$c_{4,4}=c_{4,6}=c_{6,4}=c_{6,6}=1.353322289\times10^{00}$
$c_{4,5}=c_{4,5}=-1.836665098\times10^{-01}$
$c_{5,0}=c_{5,10}=5.6224465242\times10^{00}$
$c_{5,1}=c_{5,9}=3.814742712\times10^{00}$
$c_{5,2}=c_{5,8}=2.375427614\times10^{00}$
$c_{5,3}=c_{5,7}=1.344592411\times10^{00}$
$c_{5,4}=c_{5,6}=9.136506014\times10^{-01}$
$c_{5,5}=-8.805183190\times10^{-02}$ FIG. 19 is a diagram showing the distribution of residual astigmatism obtained when a wearer of the spectacle-lens of Example 2-1 directs his eyes along each line of sight. Further, FIG. 20 is a diagram showing the distribution of mean power error obtained when a wearer of the spectacle-lens of Example 2-1 directs his eyes along each line of sight. In the case of this example, both of the residual astigmatism and the mean power error can be corrected in a wide range and can be reduced to small values, respectively. If an angle between the line of sight in an arbitrary third eye-position and the line of sight in the first eye-position is $\alpha$, each of the residual astigmatism and the mean power errors is not more than 0.01 Diopters (1/m) at least in a range where $\alpha<30°$.

Figure 21:
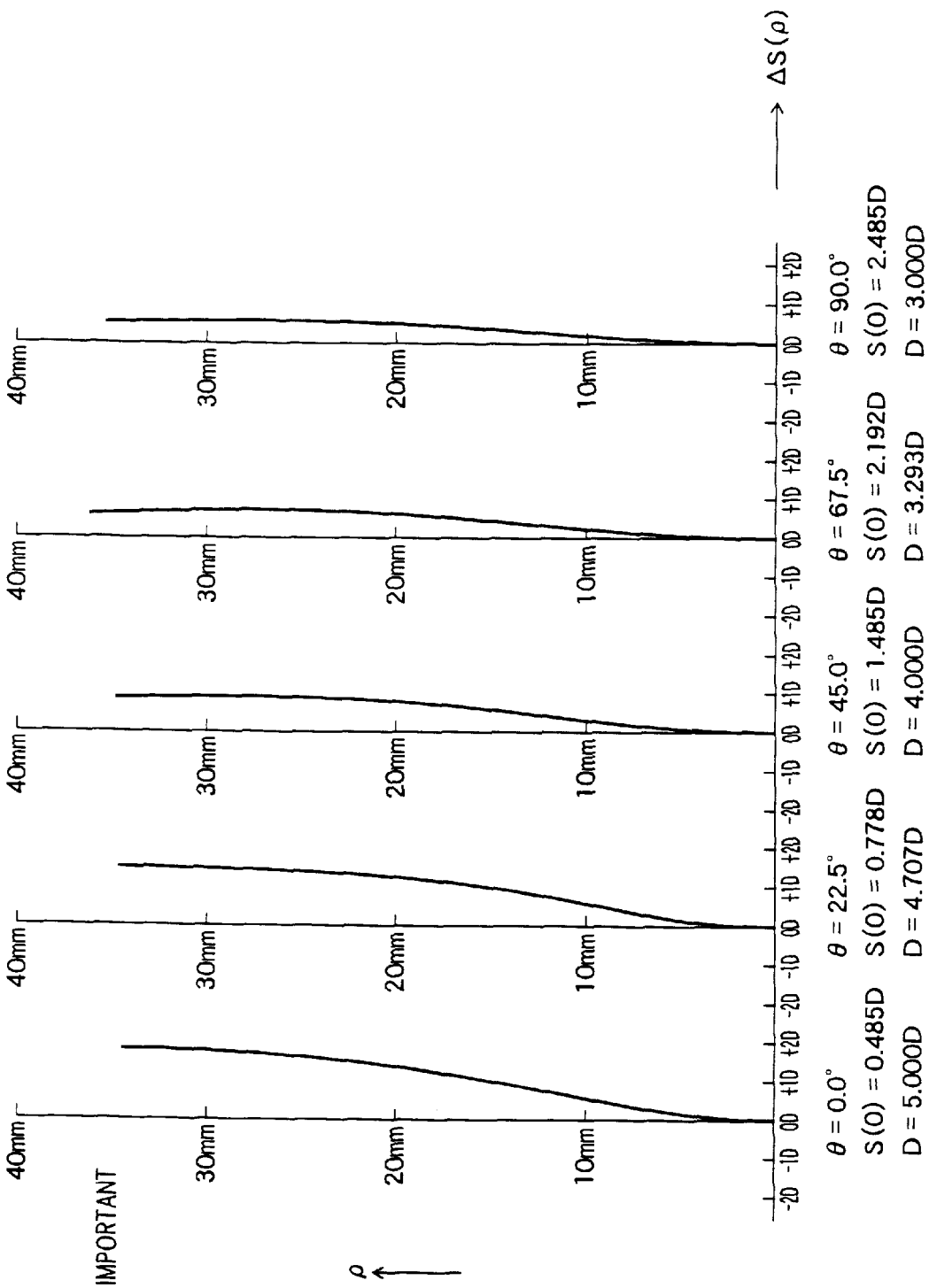
FIG. 21 is a diagram showing the distribution of ΔS(ρ) in each of the eye positions in an example of regarding what is called the wearing stability as important in the case of Example 2-2, in which the axis of abscissa represents ΔS(ρ) and is graduated at the interval of 1 Diopter (1/m), and the axis of ordinate represents ρ and is graduated at the interval of 10 mm.

FIG. 21 is a diagram showing the distribution of $\Delta S(\rho)$ of the orthogonal curve corresponding to each of five angles ($\theta=0, 22.5°, 45°, 67.5°$ and $90°$). In this figure, the axis of abscissa represents $\Delta S(\rho)$ and is graduated at the interval of 1 Diopter (1/m), and the axis of ordinate represents $\rho$ and is graduated at the interval of 10 mm. As is seen from this figure, $\Delta S(\rho)$ is small in the vicinity of the optical axis and takes positive values in the peripheral portion.

Figure 22:
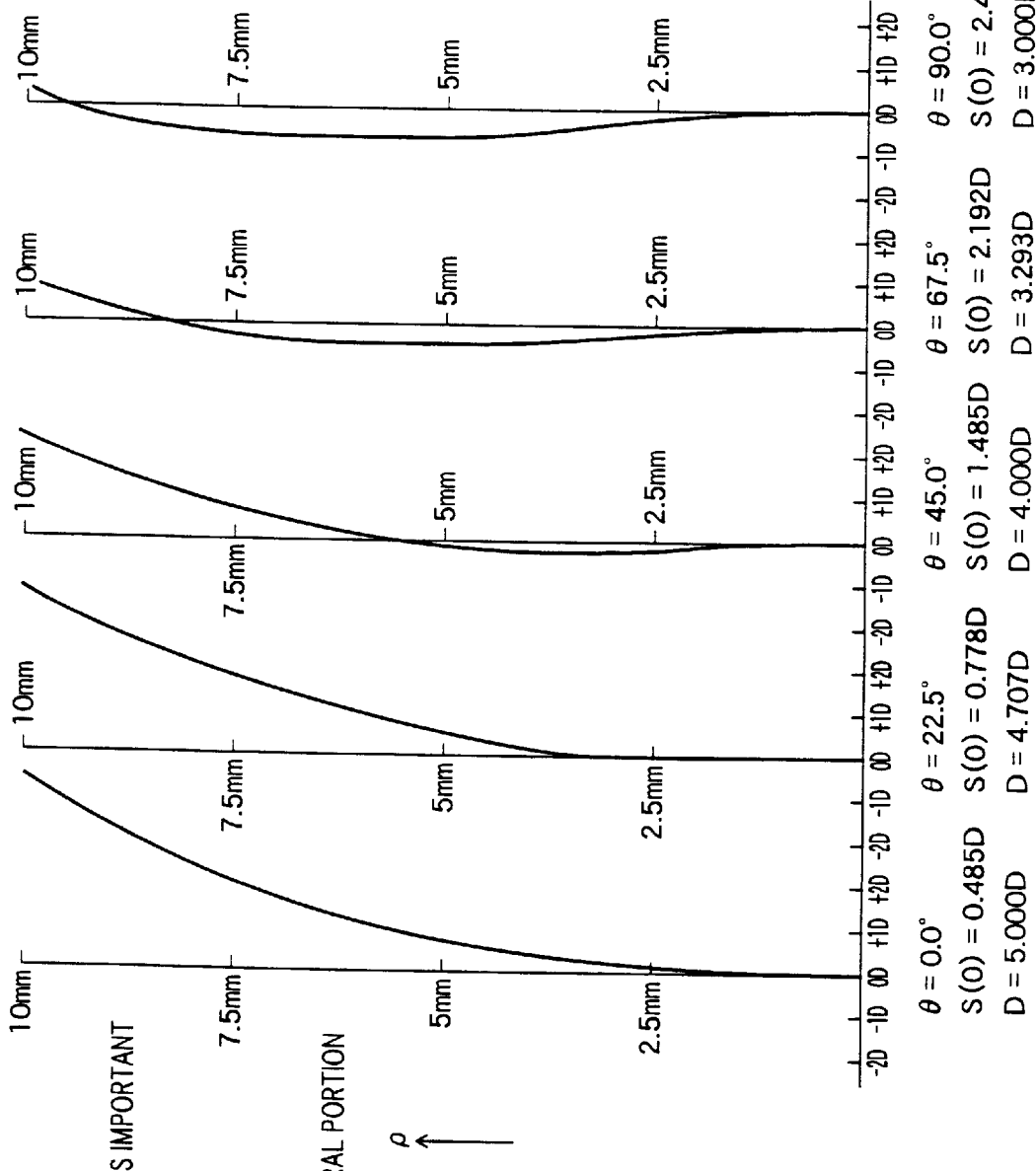
FIG. 22 is an enlarged diagram showing the central portion of the distribution of ΔS(ρ) in each of the eye positions in an example of regarding what is called the wearing stability as important in the case of Example 1-2, in which the axis of abscissa represents ΔS(ρ) and is graduated at the interval of 1 Diopter (1/m), and the axis of ordinate represents ρ and is graduated at the interval of 2.5 mm.

FIG. 22 is an enlarged diagram showing the central portion ($0<\rho<10.0$ mm) of the distribution of $\Delta S(\rho)$ of the orthogonal curve corresponding to each of five angles ($\downarrow=0, 22.5°, 45°, 67.5°$ and $90°$). Further, the axis of abscissa is graduated at the interval of 0.1 Diopter (1/m), and the axis of ordinate is graduated at the interval of 0.25 mm. In the case of each of the five angles, in a range where $0.0<\rho<4.0$ mm, $\Delta S(\rho)$ satisfies the following inequality: $-0.05<\Delta S(\rho)<0.05$. Further, in a range where $0.0\leq\rho\leq10.0$ mm, $\Delta S(\rho)$ takes a negative value at least once. Furthermore, in a range where $\rho>10.0$ mm, $\Delta S(\rho)$ takes positive values. Namely, this corresponds to and is consistent with the descriptions of the eighth and tenth aspherical spectacle-lens of the present invention.

The shapes of the aforementioned three examples are summarized in the following TABLE 4:

TABLE 4

| | Center Thickness | Maximum Edge Thickness | Minimum Edge Thickness |
|---|---|---|---|
| b. Conventional Example | 6.9992361 mm | 3.268593 mm | 0.8 mm |
| c. Example in Case of Minimum Residual Astigmatism | 6.093690 mm | 2.659397 mm | 0.8 mm |
| d. Example in Case of Regarding Wearing | 6.224427 mm | 2.655923 mm | 0.8 mm |

TABLE 4-continued

| | Center Thickness | Maximum Edge Thickness | Minimum Edge Thickness |
|---|---|---|---|
| Stability as Important | | | |

As is obvious from the aforementioned TABLE 4, because the second surface is shaped into an aspheric surface, the Embodiment 2 (namely, the Examples 2-1 and 2-2) has noticeable effects of reducing the thickness and weight of the lens.

Thus, the residual aberration in all of the third eye-positions are corrected. Simultaneously, the center or edge thickness of the lens can be set in such a manner as to be less than the thickness of a toric lens having a circular section. Furthermore, distortion aberration can be slightly corrected by the lens of the present invention, in comparison with the toric lens having the similar basic data. In a condition where the residual aberration in all of the third eye-positions is corrected, a wearer of the spectacle-lens can obtain good vision (or visual acuity) by using not only the central portion of the lens but also the peripheral portion thereof. If the lens is thin, the present invention has advantageous effects of reducing the burden imposed on the wearer and of obtaining the favorable or beautiful appearance of the lens. Furthermore, as a result of correcting distortion aberration, the degree of the distortion of an image of a viewed object is decreased.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An aspherical spectacle-lens comprising:
a first and a second refractive surface, with at least one of said refractive surfaces having an aspherical shape, wherein at least one of curved surfaces forming the first and second refractive surfaces, corresponding to the aspherically shaped surface has a configuration represented by the following equation (1):

$$x(y,z) = \sum_{i=0}^{n_y+m_y-1}\sum_{j=0}^{n_z+m_z-1} c_{i,j} N_{m_y,i}(y) N_{m_z,j}(z) \quad (1)$$

where (x,y,z) represents coordinates of a point on an aspherical surface and satisfied ($y\epsilon[a,b]\cap z\epsilon[c,d]$); $m_y$ is an order of a spline function in a direction of a y-axis ($m_y$ is an integer which is not less than 4); $m_z$ is an order of the spline function in a direction of a z-axis ($m_z$, is an integer which is not less than 4); $n_y$ is the number of inner knots in [a, b] in the direction of the y-axis ($n_y$ is an integer which is not less than 4); $n_z$ is the number of inner knots in [c, d] in the direction of the z-axis ($n_z$, is an integer which is not less than 4); $N_{my,i}(y)$ represents an ith $m_y$-th-order normalized B-spline function in a case that knots in the direction of the y-axis are $\xi_0, \xi_1, \xi_2, \ldots, \xi_{ny+2my-1}$ ("i" is an integer within [0, $n_y+m_y-1$], and a position of each knot meets the following condition: $\xi_0 \leq \xi_1 \leq \ldots <\xi_{m_y}-1 \leq a<\xi_{m_y} \leq \ldots \leq \xi_{m_y}-1 \leq a<\xi_{m_y} \leq \ldots \leq \xi_{ny+my-1}<b\leq \xi_{ny+my} \leq \ldots \leq \xi_{ny+my-1}$; $N_{mz,i}(z)$ represents an jth $m_z$-th-order normalized B-spline function in a case that knots in the direction of the z-axis are $\xi_0, \xi_1, \xi_2, \ldots, \xi_{nz+2mz-1}$, ("j" is an integer within $[0, n_z+m_z-1]$, and a position of each knot meets the following condition: $\xi_0 \leq \xi_1 \leq \ldots \leq \xi m_z-1 \leq c < \xi m_z \leq \ldots \leq \xi_{nz+m_z-1} < d \leq \xi_{nz+mz} \leq \ldots \leq \xi_{n_z+2m_{z-1}}$; and $c_{i,j}$ is a coefficient corresponding to a combination of integers "i" and "j").

2. The aspherical lens according to claim 1, wherein the knots and the coefficient are determined so that the equation (1) satisfies the following conditions:

$x(y, z)=x(y, -z)$ holds for $z \in [-a, a]$ and/or
   $x(y, z)=x(-y, z)$ holds for $y \in [-c, c]$.

3. The aspherical lens according to claim 2, wherein said B-spline function in the direction of the y-axis, the number of knots, the knots and the coefficient meet the following first or second conditions:

First Condition:
      $m_y$ is even; $n_y$ is odd;
      $\xi_{(ny+2my-1)/2}=0$, $\xi_0=-\xi_{ny+2my-1}$, $\xi_1=-\xi_{ny+2my-2}, \ldots,$
      $\xi_{(ny+2my-3)/2}=-\xi_{(nh+2my+1)/2}$; and $c_{i,j}=c_{(mj+nj-1-i),j}$ (i=0, 1, \ldots, $(m_y+n_y-3)/2$) holds for all of "j", Second Condition:
      $m_y$ is odd; $n_y$ is even;
      $\xi_0=-\xi_{ny+2my-1}$, $\xi_1=-\xi_{ny+2my-2}, \ldots, \xi_{(ny+2my-1)/2}=-\xi_{(ny+2my+1)/2}$; and $c_{i,j}=c_{(mj+nj-1-i),j}$ (i=0, 1, \ldots, $(m_y+n_y-3)/2$) holds for all of "j".

4. The aspherical lens according to claim 2, wherein said B-spline function in the direction of the z-axis, the number of knots, the knots and the coefficient meet the following first or second conditions:

First Condition:
      $m_y$ is even; $n_y$ is odd;
      $\xi_{(nz+2mz-1)/2}=0$, $\xi_0=-\xi_{nz+2mz-1}$, $\xi_1=-\xi_{nz+2mz-2}, \ldots,$
      $\xi_{(nz+2mz-3)/2}=-\xi_{(nz+2mz+1)/2}$; and $c_{i,j}=c_{i,(mj+nj-1-j)}$ (i=0, 1, \ldots, $(m_z+n_z-3)/2$) holds for all of "i", Second Condition:
      $m_y$ is odd; $n_y$ is even;
      $\xi_0=-\xi_{ny+2mz-1}$, $\xi_1=-\xi_{nz+2mz-2}, \ldots, \xi_{(nz+2mz-1)/2}=-\xi_{(nz+2mz+1)/2}$; and $c_{i,j}=c_{i,(mj+nj-1-j)}$ (i=0, 1, \ldots, $(m_z+n_z-3)/2$) holds for all of "i".

5. The aspherical lens according to claim 1, having the ability of correcting residual astigmatism and mean power error in second eye positions and in third eye positions according to Listing's law, while correcting ametropia in first eye positions.

6. An aspherical spectacle-lens including a first surface the first surface being a surface of an astigmatic lens having an aspherical shape represented by the following equation (1):

$$x(y, z) = \sum_{i=0}^{n_y+m_y-1} \sum_{j=0}^{n_z+m_z-1} c_{i,j} N_{m_y,i}(y) N_{m_z,j}(z) \quad (1)$$

where (x,y,z) represents coordinates of a point on an aspherical surface and satisfies $(y \in [a, b]) \cap (z \in [c, d])$; $m_y$ is an order of a spline function in a direction of a y-axis ($m_y$ is an integer which is not less than 4); $m_z$ is an order of the spline function in a direction of a z-axis ($m_z$ is an integer which is not less than 4); $n_y$ is the number of inner knots in $[a, b]$ in the direction of the y-axis ($n_y$ is an integer which is not less than 4); $n_z$ is the number of inner knots in $[c, d]$ in the direction of the z-axis ($n_z$ is an integer which is not less than 4); $N_{my,i}(y)$ represents an ith $m_y$-th-order normalized B-spline function in a case that knots in the direction of the y-axis are $\xi_0, \xi_1, \xi_2, \ldots, \xi_{ny+2my-1}$ ("i" is an integer within $[0, n_y+m_y-1]$, and a position of each knot meets the following condition: $\xi_0 \leq \xi_1 \leq \ldots \leq \xi m_y-1 \leq a < \xi m_y \leq \ldots \leq \xi_{ny+my-1} < b \leq \xi_{ny+my} \leq \ldots \leq \xi_{ny+my+1}$; $N_{mz,i}(z)$ represents an jth $m_z$-th-order normalized B-spline function in a case that knots in the direction of the z-axis are $\xi_0, \xi_1, \xi_2, \ldots, \xi_{nz+2mz-1}$ ("j" is an integer within $[0, n_z+m_z-1]$, and a position of each knot meets the following condition: $\xi_0 \xi_1 \leq \ldots \leq \xi m_z-1 \leq c < \xi m_z \leq \ldots \leq \xi_{nz+mz-1} < d \leq \xi_{nz+mz} \leq \ldots \leq \xi_{nz+2mz-1}$; and $c_{i,j}$ is a coefficient corresponding to a combination of integers "i" and "j"), the knots and the coefficient being determined so that the equation (1) satisfies the following conditions:

$x(y, z)=x(y, -z)$ holds for $z \in [-a, a]$ and/or
   $x(y, z)=x(-y, z)$ holds for $y \in [-c, c]$, wherein a line of intersection, which is an orthogonal curve, of an aspherical surface and an arbitrary plane including an optical axis satisfies the following first or second condition, thereby correcting residual astigmatism correspondingly to all of lines of sight, which pass through a lens surface, in such a manner as to be minimized:

First Condition:
      Lens power D on an optical axis meets the following inequality on an orthogonal cross-section plane: D>0.0; and a change in curve-power $\Delta S(\rho)$ takes negative values for arbitrary values of $\rho$ ($\rho$ denotes a distance from a predetermined point within a lens range on the orthogonal curve to the optical axis); and Second Condition:
      Lens power D on an optical axis meets the following inequality on an orthogonal cross-section plane: $D \leq 0.0$; and a change in curve-power $\Delta S(\rho)$ takes positive values for arbitrary values of $\rho$ (incidentally, $\rho$ denotes a distance from a predetermined point within a lens range on the orthogonal curve to the optical axis).

7. The aspherical lens according to claim 6, wherein said B-spline function in the direction of the y-axis, the number of knots, the knots and the coefficient meet the following first or second conditions:

First Condition:
      $m_y$ is even; $n_y$ is odd;
      $\xi_{(ny+2my-1)/2}=0$, $\xi_0=-\xi_{ny+2my-1}$, $\xi_1=-\xi_{ny+2my-2}, \ldots,$
      $\xi_{(ny+2my-3)/2}=-\tau_{(ny+2my+1)/2}$; and $c_{i,j}=c_{(mj+nj-1-i),j}$ (i=0, 1, \ldots, $(m_y+n_y-3)/2$) holds for all of "j", Second Condition:
      $m_y$ is odd; $n_y$ is even;
      $\xi_0=-\xi_{ny+2my-1}$, $\xi_1=-\xi_{ny+2my-2}, \ldots, \xi_{(ny+2my-1)/2}=-\xi_{(ny+2my+1)/2}$; and $c_{i,j}=c_{(mj+nj-1-i),j}$ (i=0, 1, \ldots, $(m_y+n_y-3)/2$) holds for all of "j".

8. The aspherical lens according to claim 6, wherein said B-spline function in the direction of the z-axis, the number of knots, the knots and the coefficient meet the following first or second conditions:

First Condition:
      $m_y$ is even; $n_y$ is odd;
      $\xi_{(nz+2mz-1)/2}=0$, $\xi_0=-\xi_{nz+2mz-1}$, $\xi_1=-\xi_{nz+2mz-2}, \ldots,$
      $\xi_{(nz+2mz-3)/2}=-\xi_{(nz+2mz+1)/2}$; and $c_{i,j}=c_{i,(mj+nj-1-j)}$ (i=0, 1, \ldots, $(m_z+n_z-3)/2$) holds for all of "i", Second Condition:
      $m_y$ is odd; $n_y$ is even;
      $\xi_0=-\xi_{ny+2mz-1}$, $\xi_1=-\xi_{nz+2mz-2}, \ldots, \xi_{(nz+2mz-1)/2}=-\xi_{(nz+2mz+1)/2}$; and $c_{i,j}=c_{i,(mj+nj-1-j)}$ (i=0, 1, \ldots, $(m_z+n_z-3)/2$) holds for all of "i".

9. An aspherical spectacle-lens including a second surface the second surface being a surface of an astigmatic lens having an aspherical shape represented by the following equation (1):

$$x(y, z) = \sum_{i=0}^{n_y+m_y-1} \sum_{j=0}^{n_z+m_z-1} c_{i,j} N_{m_y,i}(y) N_{m_z,j}(z) \quad (1)$$

where (x,y,z) represents coordinates of a point on an aspherical surface and satisfies (y∈[a, b])∩(z∈[c, d]); $m_y$ is an order of a spline function in a direction of a y-axis ($m_y$ is an integer which is not less than 4); $m_z$ is an order of the spline function in a direction of a z-axis ($m_z$ is an integer which is not less than 4); $n_y$ is the number of inner knots in [a, b] in the direction of the y-axis ($n_y$ is an integer which is not less than 4); $n_z$ is the number of inner knots in [c, d] in the direction of the z-axis ($n_z$ is an integer which is not less than 4); $N_{m_y,i}(y)$ represents an ith $m_y$-th-order normalized B-spline function in a case that knots in the direction of the y-axis are $\xi_0$, $\xi_1, \xi_2, \ldots, \xi_{n_y+2m_y-1}$ ("i" is an integer within [0, $n_y+m_y-1$], and a position of each knot meets the following condition: $\xi_0 \leq \xi_1 \leq \ldots \leq \xi_{m_y-1} \leq a < \xi_{m_y} \leq \ldots \leq \xi_{n_y+m_y-1} < b \leq \xi_{n_y+m_y} \leq \ldots \leq \xi_{n_y+m_y+1}$; $N_{m_z,i}(z)$ represents an jth $m_z$-th-order normalized B-spline function in a case that knots in the direction of the z-axis are $\xi_0, \xi_1, \xi_2, \ldots, \xi_{n_z+2m_z-1}$ ("j" is an integer within [0, $n_z+m_z-1$], and a position of each knot meets the following condition: $\xi_0 \xi_1 \leq \ldots \leq \xi_{m_z-1} \leq c < \xi_{m_z} \leq \ldots \leq \xi_{n_z+m_z-1} < d \leq \xi_{n_z+m_z} \leq \ldots \leq \xi_{n_z+2m_z-1}$; and $c_{i,j}$ is a coefficient corresponding to a combination of integers "i" and "j"), the knots and the coefficient being determined so that the equation (1) satisfies the following conditions:

x(y, z)=x(y, −z) holds for z ∈[−a, a] and/or x(y, z)=x(−y, z) holds for y ∈[−c, c], wherein a line of intersection, which is an orthogonal curve, of an aspherical surface and an arbitrary plane including an optical axis satisfies the following first or second conditions, thereby correcting residual astigmatism correspondingly to all of lines of sight, which pass through a lens surface, in such a manner as to be minimized:

First Condition:
Lens power D on an optical axis meets the following inequality on an orthogonal cross-section plane: D>0.0; and a change in curve-power Δ S(ρ) takes positive values for arbitrary values of ρ (incidentally, ρ denotes a distance from a predetermined point within a lens range on the orthogonal curve to the optical axis); and Second Condition:
Lens power D on an optical axis meets the following inequality on an orthogonal cross-section plane: D≦0.0; and a change in curve-power Δ S(ρ) takes negative values for arbitrary values of ρ (incidentally, ρ denotes a distance from a predetermined point within a lens range on the orthogonal curve to the optical axis).

10. An aspherical spectacle-lens including a first surface, the first surface being a surface of an astigmatic lens having an aspherical shape represented by the following equation (1):

$$x(y, z) = \sum_{i=0}^{n_y+m_y-1} \sum_{j=0}^{n_z+m_z-1} c_{i,j} N_{m_y,i}(y) N_{m_z,j}(z) \quad (1)$$

where (x,y,z) represents coordinates of a point on an aspherical surface and satisfies (y∈[a, b])∩(z∈[c, d]); $m_y$ is an order of a spline function in a direction of a y-axis ($m_y$ is an integer which is not less than 4); $m_z$ is an order of the spline function in a direction of a z-axis ($m_z$ is an integer which is not less than 4); $n_y$ is the number of inner knots in [a, b] in the direction of the y-axis ($n_y$ is an integer which is not less than 4); $n_z$ is the number of inner knots in [c, d] in the direction of the z-axis ($n_z$ is an integer which is not less than 4); $N_{m_y,i}(y)$ represents an ith $m_y$-th-order normalized B-spline function in a case that knots in the direction of the y-axis are $\xi_0$, $\xi_1, \xi_2, \ldots, \xi_{n_y+2m_y-1}$ ("i" is an integer within [0, $n_y+m_y-1$], and a position of each knot meets the following condition: $\xi_0 \leq \xi_1 \leq \ldots \leq \xi_{m_y-1} \leq a < \xi_{m_y} \leq \ldots \leq \xi_{n_y+m_y-1} < b \leq \xi_{n_y+m_y} \leq \ldots \leq \xi_{n_y+m_y+1}$; $N_{m_z,i}(z)$ represents an jth $m_z$-th-order normalized B-spline function in a case that knots in the direction of the z-axis are $\xi_0, \xi_1, \xi_2, \ldots, \xi_{n_z+2m_z-1}$ ("j" is an integer within [0, $n_z+m_z-1$], and a position of each knot meets the following condition: $\xi_0 \xi_1 \leq \ldots \leq \xi_{m_z-1} \leq c < \xi_{m_z} \leq \ldots \leq \xi_{n_z+m_z-1} < d \leq \xi_{n_z+m_z} \leq \ldots \leq \xi_{n_z+2m_z-1}$; and $c_{i,j}$ is a coefficient corresponding to a combination of integers "i" and "j"), the knots and the coefficient being determined so that the equation (1) satisfies the following conditions:

x(y, z)=x(y, −z) holds for z ∈[−a, a] and/or x(y, z)=x(−y, z) holds for y ∈[−c, c], wherein a line of intersection, which is an orthogonal curve, of an aspherical surface and an arbitrary plane including an optical axis satisfies the following condition, thereby correcting residual astigmatism correspondingly to all of lines of sight, which pass through a lens surface, in such a manner as to be minimized:

First Condition:
Lens power D on an optical axis meets the following inequality on an orthogonal cross-section plane: −6.0≦D≦6.0; and a change in curve-power ΔS(ρ) satisfies the following inequality for 0.0<ρ<4.0 (ρ denotes a distance from a predetermined point within a lens range on the orthogonal curve to the optical axis): −0.05≦ΔS(ρ)≦0.05.

11. The aspherical lens according to claim 10, wherein the line of intersection, which is an orthogonal curve, of an aspherical surface and an arbitrary plane including an optical axis satisfies the following first or second conditions, thereby correcting residual astigmatism correspondingly to all of lines of sight, which pass through a lens surface, in such a manner as to be minimized:

First Condition:
Lens power D on an optical axis meets the following inequality on an orthogonal cross-section plane: D>0.0; and a change in curve-power Δ S(ρ) takes a positive value at least once for 0.0<ρ<10.0 mm (ρ denotes a distance from a predetermined point within a lens range on the orthogonal curve to the optical axis) and ΔS(ρ) takes negative values for ρ>10.0 mm; and Second Condition:
Lens power D on an optical axis meets the following inequality on an orthogonal cross-section plane: D≦0.0; and a change in curve-power Δ S(ρ) takes a negative value at least once for 0.0≦ρ≦10.0 mm (ρ denotes a distance from a predetermined point within a lens range on the orthogonal curve to the optical axis) and $\Delta S(\rho)$ takes positive values for $\rho>10.0$ mm.

12. The aspherical lens according to claim 10, wherein the line of intersection, which is an orthogonal curve, of an aspherical surface and an arbitrary plane including an optical axis satisfies the following first or second conditions, thereby correcting residual astigmatism correspondingly to all of lines of sight, which pass through a lens surface, in such a manner as to be minimized:

First Condition:
Lens power D on an optical axis meets the following inequality on an orthogonal cross-section plane: $D \leq 0.0$; and a change in curve-power $\Delta S(\rho)$ takes a negative value at least once for $0.0 \leq \rho \leq 10.0$ mm ($\rho$ denotes a distance from a predetermined point within a lens range on the orthogonal curve to the optical axis) and $\Delta S(\rho)$ takes positive values for $\rho>10.0$ mm; and Second Condition:
Lens power D on an optical axis meets the following inequality on an orthogonal cross-section plane: $D \leq 0.0$; and a change in curve-power $\Delta S(\rho)$ takes a positive value at least once for $0.0 \leq \rho \leq 10.0$ mm ($\rho$ denotes a distance from a predetermined point within a lens range on the orthogonal curve to the optical axis), and $\Delta S(\rho)$ takes negative values for $\rho>10.0$ mm.

13. The spherical lens according to claim 10, wherein said B-spline function in the direction of the z-axis, the number of knots, the knots and the coefficient meet the following first or second conditions:

First Condition:
$m_y$ is even; $n_y$ is odd;
$\xi_{(nz+2mz-1)/2}=0$, $\xi_0=-\xi_{nz+2mz-1}$, $\xi_1=-\xi_{nz+2mz-2}$, . . . , $\xi_{(nz+2mz-3)/2}=-\xi_{(nz+2mz+1)/2}$; and $c_{i,j}=c_{i,(mj+nj-1-j)}$ (i=0, 1, . . . , $(m_z+n_z-3)/2$) holds for all of "i", Second Condition:
$m_y$ is odd; $n_y$ is even;
$\xi_0=-\xi_{ny+2mz-1}$, $\xi_1=-\xi_{nz+2mz-2}$, . . . , $\xi_{(nz+2mz-1)/2}=-\xi_{(nz+2mz+1)/2}$; and $c_{i,j}=c_{i,(mj+nj-1-j)}$ (i=0, 1, . . . , $(m_z+n_z-3)/2$) holds for all of "i".

14. The aspherical lens according to claim 13, wherein the line of intersection, which is an orthogonal curve, of an aspherical surface and an arbitrary plane including an optical axis satisfies the following first or second conditions, thereby correcting residual astigmatism correspondingly to all of lines of sight, which pass through a lens surface, in such a manner as to be minimized:

First Condition:
Lens power D on an optical axis meets the following inequality on an orthogonal cross-section plane: $D>0.0$; and a change in curve-power $\Delta S(\rho)$ takes a positive value at least once for $0.0<\rho<10.0$ mm ($\rho$ denotes a distance from a predetermined point within a lens range on the orthogonal curve to the optical axis) and $\Delta S(\rho)$ takes negative values for $\rho>10.0$ mm; and Second Condition:
Lens power D on an optical axis meets the following inequality on an orthogonal cross-section plane: $D \leq 0.0$; and a change in curve-power $\Delta S(\rho)$ takes a negative value at least once for $0.0 \leq \rho \leq 10.0$ mm ($\rho$ denotes a distance from a predetermined point within a lens range on the orthogonal curve to the optical axis) and $\Delta S(\rho)$ takes positive values for $\rho>10.0$ mm.

15. The aspherical lens according to claim 13, wherein the line of intersection, which is an orthogonal curve, of an aspherical surface and an arbitrary plane including an optical axis satisfies the following first or second conditions, thereby correcting residual astigmatism correspondingly to all of lines of sight, which pass through a lens surface, in such a manner as to be minimized:

First Condition:
Lens power D on an optical axis meets the following inequality on an orthogonal cross-section plane: $D \leq 0.0$; and a change in curve-power $\Delta S(\rho)$ takes a negative value at least once for $0.0 \leq \rho \leq 10.0$ mm ($\rho$ denotes a distance from a predetermined point within a lens range on the orthogonal curve to the optical axis) and $\Delta S(\rho)$ takes positive values for $\rho>10.0$ mm; and Second Condition:
Lens power D on an optical axis meets the following inequality on an orthogonal cross-section plane: $D \leq 0.0$; and a change in curve-power $\Delta S(\rho)$ takes a positive value at least once for $0.0 \leq \rho \leq 10.0$ mm ($\rho$ denotes a distance from a predetermined point within a lens range on the orthogonal curve to the optical axis), and $\Delta S(\rho)$ takes negative values for $\rho>10.0$ mm.

* * * * *